United States Patent
Nakano et al.

(10) Patent No.: US 7,865,310 B2
(45) Date of Patent: Jan. 4, 2011

(54) INFORMATION PROVISION APPARATUS AND DRIVING ASSISTANCE SYSTEM USING THE SAME

(75) Inventors: Shinichi Nakano, Suita (JP); Akira Nakaya, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 1112 days.

(21) Appl. No.: 11/543,756

(22) Filed: Oct. 4, 2006

(65) Prior Publication Data

US 2007/0078601 A1 Apr. 5, 2007

(30) Foreign Application Priority Data

Oct. 5, 2005 (JP) .............................. 2005-292822

(51) Int. Cl.
G08G 1/16 (2006.01)

(52) U.S. Cl. .............................. 701/301; 701/1; 701/45; 701/49; 701/207; 701/300; 180/271; 180/272; 340/425.5; 340/435; 340/438; 340/902; 340/903; 342/357.06; 342/357.08; 342/386

(58) Field of Classification Search ................. 701/300, 701/301
See application file for complete search history.

(56) References Cited

U.S. PATENT DOCUMENTS

| | | | | | |
|---|---|---|---|---|---|
| 5,986,575 | A * | 11/1999 | Jones et al. | ................. | 340/906 |
| 6,252,520 | B1 * | 6/2001 | Asami et al. | ................. | 340/903 |
| 6,429,789 | B1 * | 8/2002 | Kiridena et al. | ............. | 340/905 |
| 6,502,035 | B2 * | 12/2002 | Levine | ........................ | 701/301 |
| 6,559,761 | B1 * | 5/2003 | Miller et al. | ................. | 340/435 |
| 6,720,920 | B2 * | 4/2004 | Breed et al. | ................. | 342/386 |
| 6,853,906 | B1 * | 2/2005 | Michi et al. | ................. | 701/207 |
| 6,906,619 | B2 * | 6/2005 | Williams et al. | ......... | 340/425.5 |
| 6,933,837 | B2 * | 8/2005 | Gunderson et al. | ......... | 340/436 |
| 7,061,373 | B2 * | 6/2006 | Takahashi | .................... | 340/435 |
| 7,369,042 | B2 * | 5/2008 | Osaka et al. | ................. | 340/435 |
| 2002/0022927 | A1 * | 2/2002 | Lemelson et al. | ........... | 701/301 |
| 2002/0171542 | A1 * | 11/2002 | Bloomfield et al. | ......... | 340/464 |
| 2003/0014176 | A1 * | 1/2003 | Levine | ........................ | 701/70 |
| 2004/0155795 | A1 * | 8/2004 | Quintana | .................... | 340/902 |
| 2004/0260433 | A1 * | 12/2004 | Sawada et al. | ................. | 701/1 |
| 2005/0021201 | A1 * | 1/2005 | Klotz et al. | ................... | 701/35 |

(Continued)

FOREIGN PATENT DOCUMENTS

JP 2000-355820 A 12/2000

(Continued)

*Primary Examiner*—Khoi Tran
*Assistant Examiner*—Jonathan L Sample
(74) *Attorney, Agent, or Firm*—Alleman Hall McCoy Russell & Tuttle LLP

(57) ABSTRACT

An information provision apparatus mounted in a driver's vehicle, including a vehicle approach determiner configured to execute a vehicle approach determination process to determine whether or not an opponent vehicle is likely to approach the driver's vehicle at a future time, based on driving information including information as to whether a blinker of the driver's vehicle is in an on-state or in an off-state at a current time, and driving information including information as to whether a blinker of the opponent vehicle is in an on-state or in an off-state, and a notification device configured to inform a driver driving the driver's vehicle of an opponent vehicle that is likely to approach the driver's vehicle.

23 Claims, 6 Drawing Sheets

U.S. PATENT DOCUMENTS

| | | | |
|---|---|---|---|
| 2005/0195383 A1* | 9/2005 | Breed et al. | 356/4.01 |
| 2007/0013497 A1* | 1/2007 | Watanabe | 340/435 |

FOREIGN PATENT DOCUMENTS

| | | |
|---|---|---|
| JP | 2001-001851 A | 1/2001 |
| JP | 2001-023099 A | 1/2001 |
| JP | 2002-140800 | 5/2002 |
| JP | 2002-274301 A | 9/2002 |
| JP | 2004-164315 A | 6/2004 |
| JP | 2005-050187 A | 2/2005 |

* cited by examiner

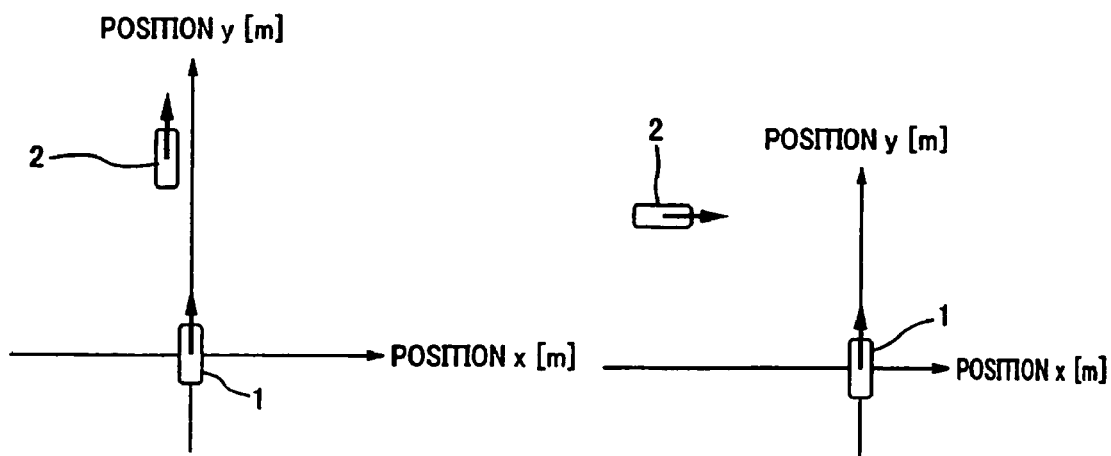
FIG. 4A
FIG. 4D
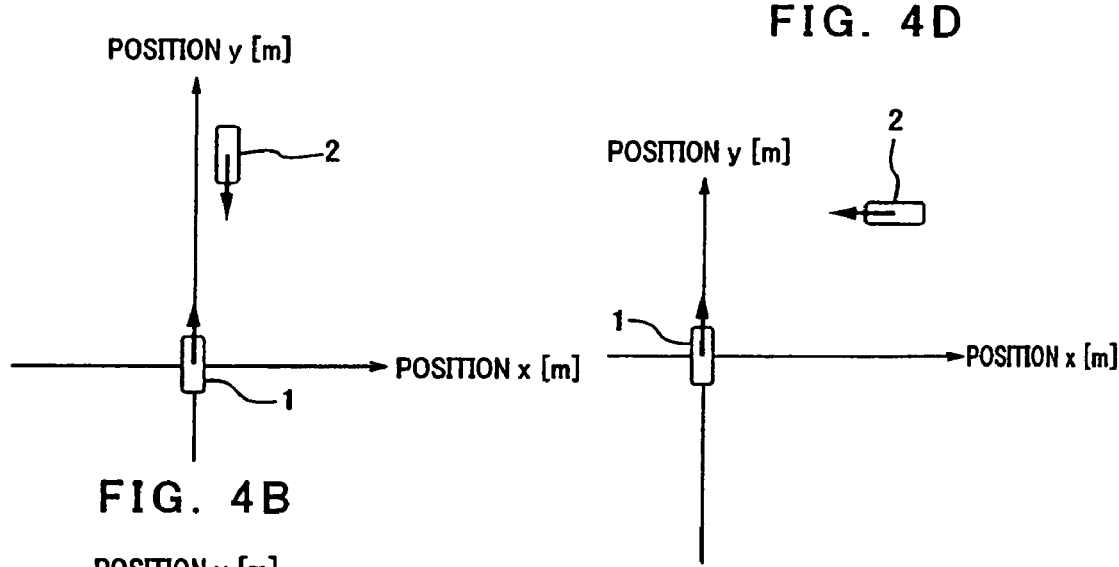
FIG. 4B
FIG. 4E
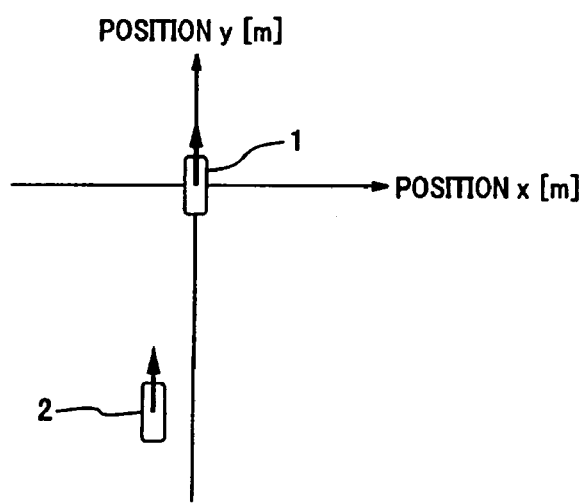
FIG. 4C

INFORMATION PROVISION APPARATUS AND DRIVING ASSISTANCE SYSTEM USING THE SAME

TECHNICAL FIELD

The present invention relates to an information provision apparatus configured to predict an approach between vehicles using a GPS (global positioning system), and a driving assistance system using the information provision apparatus.

BACKGROUND ART

Conventionally, in a device that is mounted in a vehicle such as automobile and is configured to predict an approach between vehicles, a GPS is used to detect positions of the vehicles. A display device displays a road map and positions of a driver's vehicle and an opponent vehicle. A future approach between these vehicles is predicted using the road map, the positions of the vehicles, and so on.

Japanese Laid-Open Patent Application Publication No. 2002-140800 discloses an information provision apparatus for a motorcycle that emits an alarm to a driver depending on a road condition and a driving state of the vehicles. The alarm is displayed on a display device in the form of an alarm mark or numeric or alphabetical characters.

In the device configured to predict the approach between the vehicles, since the approach between the vehicles is predicted using the information of the road map displayed on the display device, the display device is required to have a screen of a substantial size to display a precise image such as a road map image, and it is thus difficult to reduce the size of the display device. To predict the approach between the vehicles using the information of the road map, data processing such as conversion of a position of a road on the map into a coordinate system identical to a coordinate system representing the position of the vehicle is needed. As a result, a tremendous volume of data is required to be processed.

In the device disclosed in Japanese Laid-Open Patent Application Publication No. 2002-140800, the alarm mark indicates messages stating that there is a crossing vehicle or there is a vehicle coming from the opposite direction. Since the alarm mark is displayed to overlap with a map and so on of a navigation device, its impact may be weak to the driver. The driver is unable to easily recognize a velocity of the opponent vehicle or a distance from the opponent vehicle from the alarm mark. In addition, since the alarm mark is displayed to overlap with the map and so on as described above, it is difficult to reduce the size of the display device.

SUMMARY OF THE INVENTION

The present invention addresses the above described conditions, and an object of the present invention is to provide an information provision apparatus capable of predicting an approach between vehicles without substantially increasing a volume of data to be processed, and a driving assistance system using the information provision apparatus. Another object of the present invention is to provide an information provision apparatus that is equipped with a small-sized display device and is able to present to a driver an alarm indication that provides the driver with a strong impact and enables the driver to easily recognize a velocity of an opponent vehicle which is predicted to approach the driver's vehicle or a distance from the opponent car, and a driving assistance system using the information provision apparatus.

According to one aspect of the present invention, there is provided an information provision apparatus mounted in a driver's vehicle; comprising a vehicle approach determiner configured to execute a vehicle approach determination process to determine whether or not an opponent vehicle is likely to approach the driver's vehicle at a future time, based on driving information including information as to whether a blinker of the driver's vehicle is in an on-state or in an off-state at a current time, and driving information including information as to whether a blinker of the opponent vehicle is in an on-state or in an off-state at the current time; and a notification device configured to inform a driver driving the driver's vehicle of an opponent vehicle that is likely to approach the driver's vehicle, based on a result of determination by the vehicle approach determiner.

In accordance with this configuration, since it can be determined or predicted whether or not the opponent vehicle is likely to approach the driver's vehicle without using the information of the road map, the volume of data to be processed in the vehicle approach determiner does not substantially increase.

The vehicle approach determination process may include, among a first determination process, a second determination process, a third determination process, a fourth determination process, and a fifth determination process, at least the first determination process, the second determination process, and the third determination process, wherein the first determination process may be to determine whether or not the opponent vehicle is running forward and in substantially the same direction on substantially the same driving path of the driver's vehicle at the future time and is likely to approach the driver's vehicle at the future time, based on the driving information of the driver's vehicle at the current time and the driving information of the opponent vehicle at the current time; the second determination process may be to determine whether or not the opponent vehicle is running forward and from substantially the opposite direction on substantially the same driving path of the driver's vehicle at the future time and is likely to approach the driver's vehicle at the future time, based on the driving information of the driver's vehicle at the current time and the driving information of the opponent vehicle at the current time; the third determination process may be to determine whether or not the opponent vehicle is running behind the driver's vehicle and in substantially the same direction on substantially the same driving path of the driver's vehicle at the future time and is likely to approach the driver's vehicle at the future time, based on the driving information of the driver's vehicle at the current time and the driving information of the opponent vehicle at the current time; the fourth determination process may be to determine whether or not the opponent vehicle is running from leftward to rightward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and the fifth determination process may be to determine whether or not the opponent vehicle is running from rightward to leftward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time.

The vehicle approach determination process may further include a re-determination process to decide, in a case where there are plural opponent vehicles that are determined to be likely to approach the driver's vehicle in each of the determination processes of the vehicle approach determination process, one opponent vehicle that is likely to approach the driver's vehicle, based on a predetermined condition.

In accordance with this configuration, one opponent vehicle that is likely to approach the driver's vehicle can be decided and can be presented to the driver.

The vehicle approach determination process may include the first to fifth determination processes. In such a configuration, it can be determined whether or not the opponent vehicle is likely to approach the driver's vehicle with respect to various cases.

The blinker of the driver's vehicle and the blinker of the opponent vehicle may be each comprised of right and left blinkers. The driving information of the driver's vehicle at the current time which is used in the first determination process may be information of a position, a driving direction and a driving velocity of the driver's vehicle, and the driving information of the opponent vehicle at the current time which is used in the first determination process may be information of a position, a driving direction, and a driving velocity of the opponent vehicle, and information as to whether the right blinker and/or the left blinker of the opponent vehicle are in an on-state or in an off-state at the current time; wherein the driving information of the driver's vehicle at the current time which is used in the second determination process may be the information of the position, the driving direction, and the driving velocity of the driver's vehicle, and information as to whether the right blinker or the left blinker of the driver's vehicle is in an on-state or in an off-state, and the driving information of the opponent vehicle at the current time which is used in the second determination process may be the information of the position, the driving direction, and the driving velocity of the opponent vehicle, and information as to whether the right blinker or the left blinker of the opponent vehicle is in an on-state or in an off-state; wherein the driving information of the driver's vehicle at the current time which is used in the third determination process may be the information of the position, the driving direction, and the driving velocity of the driver's vehicle, and information as to whether the right blinker and/or the left blinker of the driver's vehicle are in an on-state or in an off-state, and the driving information of the opponent vehicle at the current time which is used in the third determination process may be the information of the position, the driving direction, and the driving velocity of the opponent vehicle; and wherein the driving information of the driver's vehicle at the current time which is used in the fourth and fifth determination processes may be the information of the position, the driving direction, and the driving velocity of the driver's vehicle, and the driving information of the opponent vehicle at the current time which is used in the fourth and fifth determination processes may be the information of the position, the driving direction, and the driving velocity of the opponent vehicle.

When the traffic rule defines that the vehicles keep to the left, in the second determination process, the information as to whether the right blinker of the driver's vehicle is in the on-state or in the off-state and the information as to whether the right blinker of the opponent vehicle is in the-on state or in the off-state are used, whereas when the traffic rule defines that the vehicles keep to the right, in the second determination process, the information as to whether the left blinker of the driver's vehicle is in the on-state or in the off-state and the information as to whether the left blinker of the opponent vehicle is in the on-state or in the off-state are used. In the first to fifth determination process, the position, the driving direction and the driving velocity of the driver's vehicle at the future time may be estimated from the position, the driving direction and the driving velocity of the driver's vehicle at the current time, the position, the driving direction and the driving velocity of the opponent's vehicle at the future time may be estimated from the position, the driving direction and the driving velocity of the opponent's vehicle at the current time, and it may be determined whether or not the opponent vehicle is likely to approach the driver's vehicle based on the estimated results.

The information provision apparatus may further comprise a position detector configured to detect the position of the driver's vehicle; a direction detector configured to detect the driving direction of the driver's vehicle; a communication device configured to receive the information as to whether the right blinker and/or the left blinker of the opponent vehicle are in the on-state or in the off-state and the information of the position of the opponent vehicle; and a calculator configured to calculate the driving direction and the driving velocity of the opponent vehicle from the information of the position of the opponent vehicle which is received by the communication device; wherein the vehicle approach determiner is configured to obtain the information as to whether the right blinker and/or the left blinker of the driver's vehicle are in the on-state or in the off-state and the information of the driving velocity of the driver's vehicle from a vehicle body of the driver's vehicle.

The position detector may include a GPS sensor, and the direction detector may include a calculator configured to calculate the driving direction of the driver's vehicle from the position of the driver's vehicle which is detected by the GPS sensor.

The position detector and the direction detector may include the GPS sensor.

The information provision apparatus may further comprise a position detector configured to detect the position of the driver's vehicle; a direction detector configured to detect the driving direction of the driver's vehicle; a communication device configured to receive the information as to whether the right blinker and/or the left blinker of the opponent vehicle are in the on-state or in the off-state and the information of the position and the driving direction of the opponent vehicle; and a calculator configured to calculate the driving velocity of the opponent vehicle based on the information of the position of the opponent vehicle which is received by the communication device; wherein the vehicle approach determiner may be configured to obtain the information as to whether the right blinker and/or the left blinker of the driver's vehicle are in the on-state or in the off-state and the information of the driving velocity of the driver's vehicle from a vehicle body of the driver's vehicle.

The information provision apparatus may further comprise a position detector configured to detect the position of the driver's vehicle; a direction detector configured to detect the driving direction of the driver's vehicle; a communication device configured to receive the information as to whether the right blinker and/or the left blinker of the opponent vehicle are in the on-state or in the off-state and the information of the position and the driving velocity of the opponent vehicle; and a calculator configured to calculate the driving direction of the opponent vehicle from the information of the position of the opponent vehicle which is received by the communication device; wherein the vehicle approach determiner may be configured to obtain the information as to whether the right blinker and/or the left blinker of the driver's vehicle are in the on-state or in the off-state and the information of the driving velocity of the driver's vehicle from a vehicle body of the driver's vehicle.

The vehicle approach determiner may be configured to execute a first detection process to detect the opponent vehicle running forward of the driver's vehicle and in substantially the same direction on substantially the same driving path of the driver's vehicle at the current time based on the driving information of the driver's vehicle at the current time and the driving information of the opponent vehicle at the current time, and then may execute the first determination process with respect to the detected opponent vehicle; wherein the vehicle approach determiner may be configured to execute a second detection process to detect the opponent vehicle running forward of the driver's vehicle and from substantially the opposite direction on substantially the same driving path of the driver's vehicle at the current time, based on the driving information of the driver's vehicle at the current time and the driving information of the opponent vehicle at the current time, and then execute the second determination process with respect to the detected opponent vehicle; wherein the vehicle approach determiner may be configured to execute a third detection process to detect the opponent vehicle running behind the driver's vehicle and in substantially the same direction on substantially the same driving path of the driver's vehicle at the current time, based on the driving information of the driver's vehicle at the current time and the driving information of the opponent vehicle at the current time, and then execute the third determination process with respect to the detected opponent vehicle; wherein the vehicle approach determiner may be configured to execute a fourth detection process to detect the opponent vehicle running forward of the driver's vehicle and from leftward to rightward of the driver's vehicle so as to substantially cross the driving direction of the driver's vehicle, based on the driving information of the driver's vehicle at the current time and the driving information of the opponent vehicle at the current time, and then execute the fourth determination process with respect to the detected opponent vehicle; and wherein the vehicle approach determiner may be configured to execute a fifth detection process to detect the opponent vehicle running forward of the driver's vehicle and from rightward to leftward of the driver's vehicle so as to substantially cross the driving direction of the driver's vehicle, based on the driving information of the driver's vehicle at the current time and the driving information of the opponent vehicle at the current time, and then execute the fifth determination process with respect to the detected opponent vehicle. In such a configuration, the volume of data to be processed in the vehicle approach determiner can be reduced.

The driving information of the driver's vehicle at the current time which is used in each of the first to fifth detection processes may be the information of the position and the driving direction of the driver's vehicle, and the driving information of the opponent vehicle at the current time may be the information of the position and the driving direction of the opponent vehicle.

The vehicle approach determination process may be to determine whether or not the opponent vehicle is likely to approach the driver's vehicle at plural future times, and the plural future times may include times that are set at constant intervals in a period that lapses a predetermined time from the current time.

The vehicle approach determiner may be configured to periodically repeat the vehicle approach determination process.

The notification device may be a display device configured to display the opponent vehicle that is likely to approach the driver's vehicle on a screen of the display device by an icon. In accordance with this configuration, because the information of the road map is not used, the map and so on are not displayed on the screen, and thus the information can be effectively presented to the driver impressively by the icon displayed on the screen. In addition, since the display device is configured to display a simple image, it can be small in size. The display device can be easily mounted into two-wheeled vehicles into which a large screen device such as a car navigation is difficult to mount.

The display device may be configured to display a smaller icon when a distance between the driver's vehicle and the opponent vehicle at the current time that is calculated from the information of the position of the driver's vehicle included in the driving information of the driver's vehicle at the current time and the information of the position of the opponent vehicle included in the driving information of the opponent vehicle at the current time that is likely to approach the driver's vehicle is a predetermined value or more and to display a larger icon when the distance is less than the predetermined value. In accordance with this configuration, the driver is able to easily recognize the distance to the opponent vehicle that is likely to approach the driver's vehicle according to the size of the icon.

The display device may be configured to display a pattern indicating a degree of the driving velocity of the opponent vehicle as a background image of the icon, based on the information of the driving velocity of the opponent vehicle that is included in the driving information of the opponent vehicle at the current time that is likely to approach the driver's vehicle. In accordance with this configuration, the driver is able to easily recognize the degree of the driving velocity of the opponent vehicle that is likely to approach the driver's vehicle.

The pattern displayed as the background image of the icon may be a V-shaped stripe pattern, and the degree of the driving velocity of the opponent vehicle may be indicated in such a manner that a width and/or spacing of a stripe of the V-shaped stripe pattern is made smaller when the driving velocity of the opponent vehicle that is likely to approach the driver's vehicle is a predetermined value or more and is made larger when the driving velocity of the opponent vehicle is less than the predetermine value, and/or an angle of a V-shape of the V-shaped stripe pattern is made smaller when the driving velocity of the opponent vehicle is the predetermined or more and is made larger when the driving velocity of the opponent vehicle is less than the predetermined value. In accordance with this configuration, the driver is able to easily recognize the degree of the driving velocity of the opponent vehicle that is likely to approach the driver's vehicle.

The display device may be configured to display the icon in a shape indicating a type of the opponent vehicle, based on information of the type of the opponent vehicle that is likely to approach the driver's vehicle. In accordance with this configuration, the driver is able to easily find the opponent vehicle that is likely to approach the driver's vehicle on the road.

The vehicle approach determination process may include, among a first determination process, a second determination process, a third determination process, a fourth determination process, and a fifth determination process, at least the first determination process, the second determination process, and the third determination process, wherein the first determination process may be to determine whether or not the opponent vehicle is running forward and in substantially same direction on substantially same driving path of the driver's vehicle at the future time and is likely to approach the driver's vehicle at the future time, based on the driving information of the driver's vehicle at the current time and the driving information of the opponent vehicle at the current time; the second determination process may be to determine whether or not the opponent vehicle is running forward and from substantially the opposite direction on substantially the same driving path of the driver's vehicle at the future time and is likely to approach the driver's vehicle at the future time, based on the driving information of the driver's vehicle at the current time and the driving information of the opponent vehicle at the current time; the third determination process may be to determine whether or not the opponent vehicle is running behind the driver's vehicle and in substantially the same direction on substantially the same driving path of the driver's vehicle at the future time and is likely to approach the driver's vehicle at the future time, based on the driving information of the driver's vehicle at the current time and the driving information of the opponent vehicle at the current time; the fourth determination process may be to determine whether or not the opponent vehicle is running from leftward to rightward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and the fifth determination process may be to determine whether or not the opponent vehicle is running from rightward to leftward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and wherein the display device may be configured to divide a display region of the screen into plural determination display regions for displaying icons of the opponent vehicles that are determined to be likely to approach the driver's vehicle in the determination processes of the vehicle approach determination process so as to respectively correspond to the determination processes, and the determination display regions may be disposed to substantially reflect a positional relationship between the driver's vehicle and the opponent vehicles which are associated with the respective determination processes in a positional relationship between an icon of the driver's vehicle and the icons of the opponent vehicles displayed on the determination display regions when the icon of the driver's vehicle is displayed at a substantially center region of the screen. In accordance with this configuration, the driver is able to easily recognize from what direction the opponent vehicle is approaching the driver's vehicle by glancing at the screen of the display device.

The vehicle approach determination process may include the first to fifth determination processes; and wherein the display device may be configured to dispose the determination display region corresponding to the first determination process at an upper region of one of a left side and a right side of the screen, the determination display region corresponding to the second determination process at an upper region of an opposite side of the left side and the right side of the screen, the determination display region corresponding to the third determination process at a substantially center position of a lower region of the screen, the determination display region corresponding to the fourth determination process at a center region or a lower region of the left side of the screen, and the determination display region corresponding to the fifth determination process at a center region or a lower region of the right side of the screen. In accordance with this configuration, the driver is able to easily recognize from what direction the opponent vehicle is approaching the driver's vehicle by glancing at the screen of the display device, when the traffic rule defines that vehicles keep to the left.

According to another aspect of the present invention, there is provided an information provision apparatus mounted in a driver's vehicle, comprising a vehicle approach determiner configured to determine whether or not an opponent vehicle is likely to approach the driver's vehicle at a future time; and a display device configured to display the opponent vehicle that is likely to approach the driver's vehicle by an icon on a screen of the display device based on a determination result by the vehicle approach determiner in such a manner that a smaller icon is disposed when a distance between the driver's vehicle and the opponent vehicle at a current time is a predetermined value or more and a larger icon is displayed when the distance is less than the predetermined value.

In accordance with this configuration, because the information of the road map is not used, the map and so on are not displayed on the screen, and thus the information can be effectively presented to the driver impressively by the icon displayed on the screen. In addition, since the display device is configured to display a simple image, it can be small in size. The display device can be easily mounted into two-wheeled vehicles into which a large screen device such as a car navigation is difficult to mount. In addition, the driver is able to easily recognize the distance to the opponent vehicle that is likely to approach the driver's vehicle according to the size of the icon.

The display device may be configured to display a pattern indicating a degree of the driving velocity of the opponent vehicle at the current time that is likely to approach the driver's vehicle as a background image of the icon. In accordance with this configuration, the driver is able to easily recognize the degree of the driving velocity of the opponent vehicle that is likely to approach the driver's vehicle.

The pattern displayed as the background image of the icon may be a V-shaped stripe pattern, and the degree of the driving velocity of the opponent vehicle may be indicated in such a manner that a width and/or spacing of a stripe of the V-shaped stripe pattern is made smaller when the driving velocity of the opponent vehicle that is likely to approach the driver's vehicle is a predetermined value or more and is made larger when the driving velocity of the opponent vehicle is less than the predetermined value, and/or an angle of a V-shape of the V-shaped stripe pattern is made smaller when the driving velocity of the opponent vehicle is a predetermined value or more and is made larger when the driving velocity of the opponent vehicle is less than the predetermined value. In accordance with this configuration, the driver is able to easily recognize the degree of the driving velocity of the opponent vehicle that is likely to approach the driver's vehicle.

The display device may be configured to display the icon in a shape indicating a type of the opponent vehicle, based on information of the type of the opponent vehicle that is likely to approach the driver's vehicle. In accordance with this configuration, the driver is able to easily find the opponent vehicle that is likely to approach the driver's vehicle on the road.

The vehicle approach determiner may be configured to execute plural determination processes, among a first determination process, a second determination process, a third determination process, a fourth determination process, and a fifth determination process, wherein the first determination process may be to determine whether or not the opponent vehicle is running forward and in substantially the same direction on substantially the same driving path of the driver's vehicle at the future time and is likely to approach the driver's vehicle at the future time; the second determination process may be to determine whether or not the opponent vehicle is running forward and from substantially the opposite direction on substantially the same driving path of the driver's vehicle at the future time and is likely to approach the driver's vehicle at the future time; the third determination process may be to determine whether or not the opponent vehicle is running behind the driver's vehicle and in substantially the same direction on substantially the same driving path of the driver's vehicle at the future time and is likely to approach the driver's vehicle at the future time; the fourth determination process may be to determine whether or not the opponent vehicle is running from leftward to rightward of the driver's vehicle so as to substantially cross the driving direction of the driver's vehicle at the future time and is likely to approach the driver's vehicle at the future time; and the fifth determination process may be to determine whether or not the opponent vehicle is running from rightward to leftward of the driver's vehicle so as to substantially cross the driving direction of the driver's vehicle at the future time and is likely to approach the driver's vehicle at the future time; and wherein the display device may be configured to divide a display region of the screen into plural determination display regions for displaying icons of the opponent vehicles that are determined to be likely to approach the driver's vehicle in the respective determination processes so as to respectively correspond to the determination processes, and the determination display regions may be disposed to substantially reflect a positional relationship between the driver's vehicle and the opponent vehicles which are associated with the respective determination processes in a positional relationship between an icon of the driver's vehicle and the icons of the opponent vehicles displayed on the determination display regions when the icon of the driver's vehicle is displayed at a substantially center region of the screen. In accordance with this configuration, the driver is able to easily recognize from what direction the opponent vehicle is approaching the driver's vehicle by glancing the screen of the display device.

The vehicle approach determiner may be configured to execute the first to fifth determination processes; and wherein the display device may be configured to dispose the determination display region corresponding to the first determination process at an upper region of a left side of the screen, the determination display region corresponding to the second determination process at an upper region of a right side of the screen, the determination display region corresponding to the third determination process at a substantially center position of a lower region of the screen, the determination display region corresponding to the fourth determination process at a center region or a lower region of the left side of the screen, and the determination display region corresponding to the fifth determination process at a center region or a lower region of the right side of the screen. In accordance with this configuration, the driver is able to easily recognize from what direction the opponent vehicle is approaching the driver's vehicle by glancing the screen of the display device when the traffic rule defines that vehicles keep to the left.

The vehicle approach determiner may be configured to execute the first to fifth determination processes; and wherein the display device may be configured to dispose the determination display region corresponding to the first determination process at an upper region of a right side of the screen, the determination display region corresponding to the second determination process at an upper region of a left side of the screen, the determination display region corresponding to the third determination process at a substantially center position of a lower region of the screen, the determination display region corresponding to the fourth determination process at a center region or a lower region of the left side of the screen, and the determination display region corresponding to the fifth determination process at a center region or a lower region of the right side of the screen. In accordance with this configuration, the driver is able to easily recognize from what direction the opponent vehicle is approaching the driver's vehicle by glancing at the screen of the display device when the traffic rule defines that vehicles keep to the right.

According to a further aspect of the present invention, there is provided a driving assistance system comprising an information provision apparatus mounted in a driver's vehicle; including a vehicle approach determiner configured to execute a vehicle approach determination process to determine whether or not an opponent vehicle is likely to approach the driver's vehicle at a future time, based on driving information including information as to whether a blinker of the driver's vehicle is in an on-state or in an off-state at a current time, and driving information including information as to whether a blinker of the opponent vehicle is in an on-state or in an off-state at the current time; and a notification device configured to inform a driver driving the driver's vehicle of an opponent vehicle that is likely to approach the driver's vehicle, based on a result of determination by the vehicle approach determiner; and an information transmitter mounted in the opponent vehicle, including: an opponent vehicle information detector configured to detect driving information of the opponent vehicle at a current time which is used in the information provision apparatus, from the opponent vehicle; and an opponent vehicle communication device configured to transmit the information detected by the opponent vehicle information detector; wherein the information provision apparatus may include a communication device configured to receive the information transmitted from the opponent vehicle communication device and to present the information to the vehicle approach determiner.

In accordance with this configuration, the driving assistance system is able to predict whether or not the vehicles are likely to approach without increasing the volume of data to be processed. In addition, the driving assistance system is equipped with a small-sized display device, and is able to present to a driver an alarm indication that provides the driver with a strong impact and enables the driver to easily recognize the velocity of an opponent vehicle which is predicted to approach the driver's vehicle or a distance from the opponent car.

The vehicle approach determiner may be configured to calculate the driving information of the opponent vehicle at the current time, based on the information presented by the communication device.

In accordance with this configuration, the driving assistance system is able to predict whether or not the vehicles are likely to approach without increasing the volume of data to be processed. In addition, the driving assistance system is equipped with a small-sized display device, and is able to present to a driver an alarm indication that provides the driver with a strong impact and enables the driver to easily recognize the velocity of an opponent vehicle which is predicted to approach the driver's vehicle or the distance from the opponent car.

The above and further objects and features of the invention will more fully be apparent from the following detailed description with accompanying drawings.

BRIEF DESCRIPTION OF THE DRAWINGS

FIGS. 4A to 4E are views illustrating five cases with respect to which it is determined whether or not probability of approach of the opponent vehicle to the driver's vehicle is high according to the first embodiment of the present invention;

DETAILED DESCRIPTION OF THE PREFERRED EMBODIMENTS

Hereinafter, preferred embodiments of the present invention will be described with reference to the drawings.

First Embodiment

Figure 1:
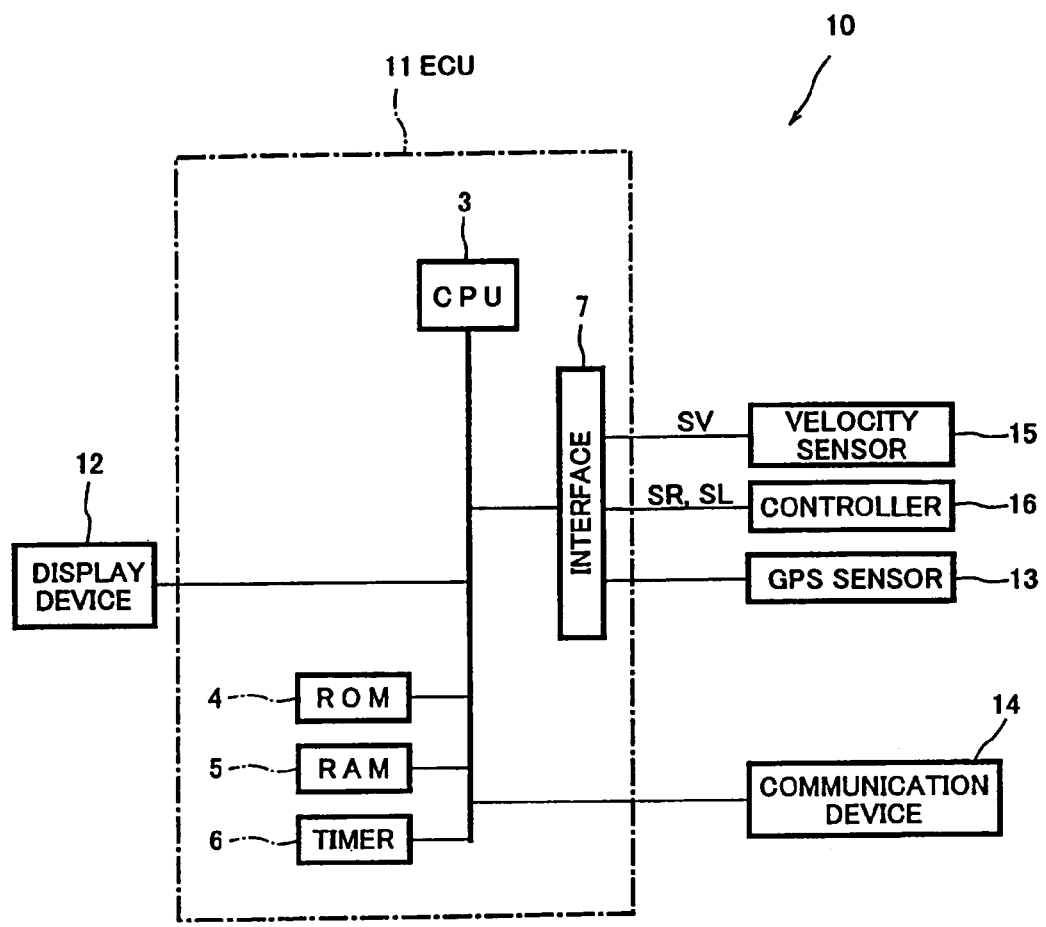
FIG. 1 is a block diagram showing a construction of an information provision apparatus according to a first embodiment of the present invention.

FIG. 1 is a block diagram showing a construction of an information provision 10 device according to the embodiments of the present invention. The information provision apparatus 10 is mounted in each of a plurality of vehicles, and includes an ECU (electronic control unit) 11 which is a vehicle approach determiner. The ECU 11 mainly includes a microcomputer comprised of a CPU 3, a ROM 4, a RAM 5, a timer 6, and an interface 7. The ECU 11 causes the CPU 3 to run a computer program stored in the ROM 4 to operate as follows. Data and so on generated or obtained by the operation of the CPU are temporarily stored in the RAM 5.

A display device 12 is a display configured to inform a driver that an opponent vehicle is likely to approach a driver's vehicle. The display device 12 may be configured to conduct color display or a monochrome display.

A GPS (global positioning system) sensor 13 is configured to receive an electric wave transmitted from a satellite (GPS satellite) and to detect a current position (latitude and longitude) of the driver's vehicle and an azimuth angle (clockwise angle measured with north set to zero degree) in a driving direction of the driver's vehicle from a time-lapse change of the current position. The GPS sensor 13 outputs the detected current position of the driver's vehicle and the detected azimuth angle to the ECU 11. It should be appreciated that the azimuth angle in the driving direction may be detected by a compass equipped in the vehicle. The GPS sensor 13 may be desirably configured such that a gyroscope is mounted in the vehicle to be able to detect the current position by autonomous navigation in a place where the electric wave does not reach. Information indicating the current position and the azimuth angle in the driving direction of the driver's vehicle which are output from the GPS sensor 13 to the ECU 11 are presented to the CPU 3 through the interface 7.

The ECU 11 receives, from a velocity sensor 15 attached to a vehicle body of the driver's vehicle, a velocity signal SV indicating a driving velocity which is detected by the velocity sensor 15. The ECU 11 further receives, from a controller 16 equipped in the vehicle body of the driver's vehicle, a control signal SR of a blinker (hereinafter referred to as a right blinker) for turning right and changing to a right lane, and a control signal SL of a blinker (hereinafter referred to as a left blinker) for turning left and changing to a left lane. The velocity signal SV output from the velocity sensor 15 to the ECU 11, and the control signals SR and SL associated with the right blinker and/or the left blinker which are output from the controller 16 to the ECU 11 are sent to the CPU 3 through the interface 7.

A communication device 14 carries out a two-way communication with the information provision apparatus 10 mounted in the opponent vehicle. The communication device 14 can employ, for example, a broadcast system. A communication range of the communication device 14 is set to, for example, about 400 m in radius. The information provision apparatus 10 illustrated in FIG. 1 is equipped in each vehicle to periodically transmit information regarding each vehicle to the information provision apparatus on the receiver side, to, for example, present to a driver, information regarding the opponent vehicle which is likely to approach the driver's vehicle. The period of transmission of the information is, for example, 0.1 second.

In this embodiment, it is assumed that the information provision apparatus of FIG. 1 is equipped in opponent vehicles in the vicinity of the driver's vehicle. The information provision apparatuses equipped in the driver's vehicle and the opponent vehicles are respectively configured to transmit information of the corresponding vehicles to construct a driving assistance system that is able to assist driving of the vehicles. The information transmitted from each information provision apparatus includes information of the current position (latitude and longitude) and the azimuth angle in the driving direction of the associated vehicle, information of the velocity of the associated vehicle, information as to whether the right blinker and/or the left blinker of the associated vehicle are in an on-state or in an off-state, information of a type of the associated vehicle such as a two-wheeled vehicle, ordinary motor vehicle, and a large-sized vehicle, identification information of the associated vehicle (identification information to identify the information provision apparatus equipped in each vehicle, i.e., address assigned to the information provision apparatus), etc. These information are transmitted from the communication device 14 under control of the ECU 11. The information of the type of the vehicle is pre-stored in the ROM 4, or the like in the ECU 11. In this embodiment, the two-wheeled vehicle is a motorbike or a motorcycle defined by the Japanese Road Traffic Law or similar vehicle under the laws of other countries, the ordinary motor vehicle is an automobile defined by the Japanese Road Traffic Law or similar vehicle under the laws of other countries, and the large-sized vehicle is a large-sized vehicle and a large-sized special motor vehicle defined by the Japanese Road Traffic Law or similar vehicle under the laws of other countries, but these are merely exemplary.

As used herein, the term "opponent vehicle" means a vehicle capable of communication between the information provision apparatus equipped in the opponent vehicle and the information provision apparatus equipped in the driver's vehicle through their respective communication devices 14.

Figure 2:
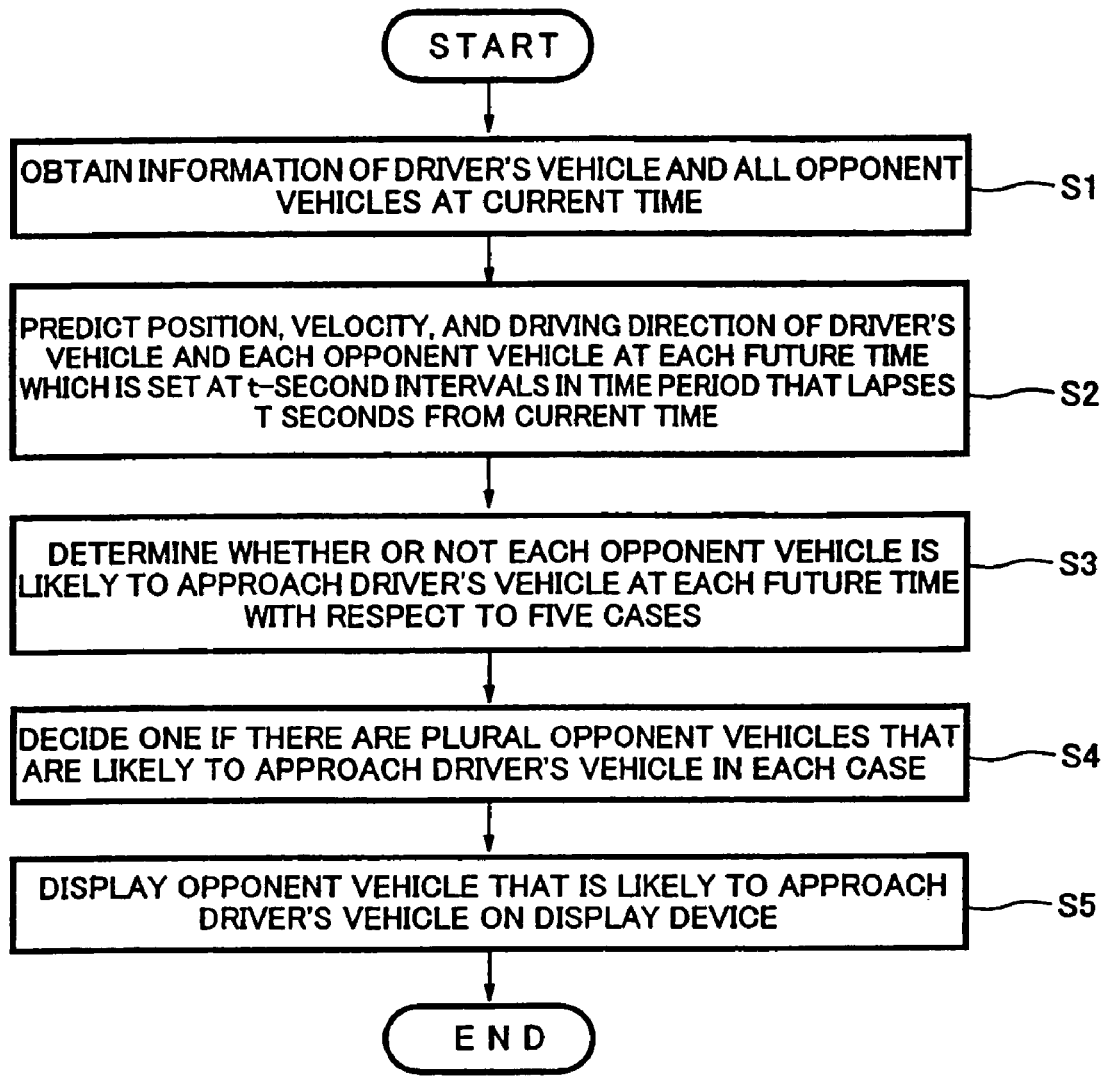
FIG. 2 is a flowchart showing an operation of the information provision apparatus according to the first embodiment of the present invention.

FIG. 2 is a flowchart showing an operation of the information provision apparatus 10 according to the first embodiment. The operation of the information provision apparatus 10 is controlled by the ECU 11.

Steps S1 to S5 are repeated at t (e.g., 0.1) second intervals.

In step S1, the ECU 11 obtains information of the driver's vehicle and information of all opponent vehicles in the vicinity of the driver's vehicle at a current time. Information obtained for t seconds from the start point of previous steps S1 to S5 to the start point of the current steps S1 to S5 is assumed as the information at the current time obtained in the current step S1. The ECU 11 obtains, from the GPS sensor 13, driving information of the driver's vehicle, such as information of the position (latitude and longitude) and the azimuth angle in the driving direction of the driver's vehicle, information of the velocity of the driver's vehicle from the velocity signal SV, and information as to whether the right blinker and/or the left blinker of the driver's vehicle are in the on-state or in the off-state, from the control signal SR of the right blinker and the control signal SL of the left blinker, respectively. In addition, the ECU 11 receives, through the communication device 14, driving information of the opponent vehicle such as the position (latitude and longitude) of the opponent vehicle, and the azimuth angle in the driving direction of the opponent vehicle, information of the velocity of opponent vehicle, and information as to whether the right blinker and/or the left blinker of the opponent vehicle are in the on-state or in the off-state, which are transmitted from the information provision apparatus mounted in the opponent vehicle. Furthermore, the ECU 11 receives, through the communication device 14, information of the type of opponent vehicle (e.g., two-wheeled vehicle, ordinary motor vehicle, and large-sized vehicle) as well.

In step S2, the ECU 11 predicts the position, the velocity, the driving direction (azimuth angle) of the driver's vehicle and each opponent vehicle at each time (hereinafter referred to as future time) which is set at t-second intervals in a time period that lapses T seconds (e.g., 10 seconds) from the current time, based on the information of the position, the velocity, and the driving direction (azimuth angle) of the driver's vehicle and each opponent vehicle at the current time which have been obtained in step S1. Herein, it is assumed that the velocity and the driving direction obtained in step S1 are maintained for T seconds to predict the velocity and the driving direction at each future time in the period that lapses T seconds from the current time, and the positions of the driver's vehicle and each opponent vehicle at each future time are calculated. The current time is t0 and each future time set at t-second intervals in the period that lapses T seconds from the current point is tn (n=1, 2, ..., m m=T/t). If t=0.1 second and T=10 seconds, the position of the driver's vehicle and each opponent vehicle at each future time tn, from t1 to t100 are calculated.

Then, in step S3, the ECU 11 determines whether or not the opponent vehicles are likely to approach the driver's vehicle at each future time tn with respect to fives cases described later, based on the information as to whether the right blinker and/or the left blinker of the driver's vehicle and each opponent vehicle are in the on-state or in the off-state which have been obtained in step S1 and the position, the velocity, and the driving direction of the driver's vehicle and each opponent vehicle which have been predicted in step S2. This determination process will be described in detail later.

If it is determined that there are plural opponent vehicles that are likely to approach the driver's vehicle with respect to the respective cases in step S3, the ECU 11 decides one opponent vehicle, for example, one opponent vehicle whose future time when that opponent vehicle is likely to approach the driver's vehicle 1 is the earliest in step S4. If it is determined that there are plural opponent vehicles that are likely to approach the driver's vehicle 1 at the earliest future time, the ECU 11 decides one opponent vehicle according to the velocity of the opponent vehicle at the current time t0, among the plural opponent vehicles. If it is determined that there are plural opponent vehicles with an equal velocity, the ECU 11 decides one opponent vehicle according to the type of vehicle in the following order: two-wheeled vehicle, the ordinary motor vehicle, and the large-sized vehicle. If it is determined that there are plural vehicles of the same type, the ECU 11 decides one opponent vehicle with a shortest distance from the driver's vehicle. In this manner, in step S4, the ECU 11 decides one opponent vehicle that is likely to approach the driver's vehicle in view of the future time when the opponent vehicle is likely to approach the driver's vehicle, the velocity of opponent vehicle, the type of the opponent vehicle, and the distance from the diver's vehicle in this order. Whereas four stages are adopted to decide one opponent vehicle that is likely to approach the driver's vehicle, other configurations may alternatively be adopted, for example, two stages of the future time when the opponent vehicle is likely to approach the driver's vehicle and the velocity of opponent vehicle in this order, three stages of the future time t0 approach the driver's vehicle, the velocity of the opponent vehicle, and the type of opponent vehicle in this order, or three stages of the future time t0 approach the driver's vehicle, the velocity of opponent vehicle, and the distance from the driver's vehicle in this order.

In step S5, the ECU 11 causes the display device 12 to display the opponent vehicle which has been determined to be likely to approach the driver's vehicle based on the results of step S3 and step S4.

It should be appreciated that steps S2 and S3 may be repeated in such a manner that, for example, the position, the velocity, and the driving direction of the driver's vehicle at each future time tn are predicted, then the position, the velocity, and the driving direction of an arbitrary opponent vehicle at each future time tn are predicted, and it is determined whether or not the opponent vehicle is likely to approach the driver's vehicle 1 at each future time tn, until all the opponent vehicles have been subjected to the determination with respect to the five cases.

Now, the determination process in step S3 will be described. Hereinafter, the driver's vehicle is referenced to by a reference number 1 and the opponent vehicle is referenced to by a reference number 2.

Figure 3:
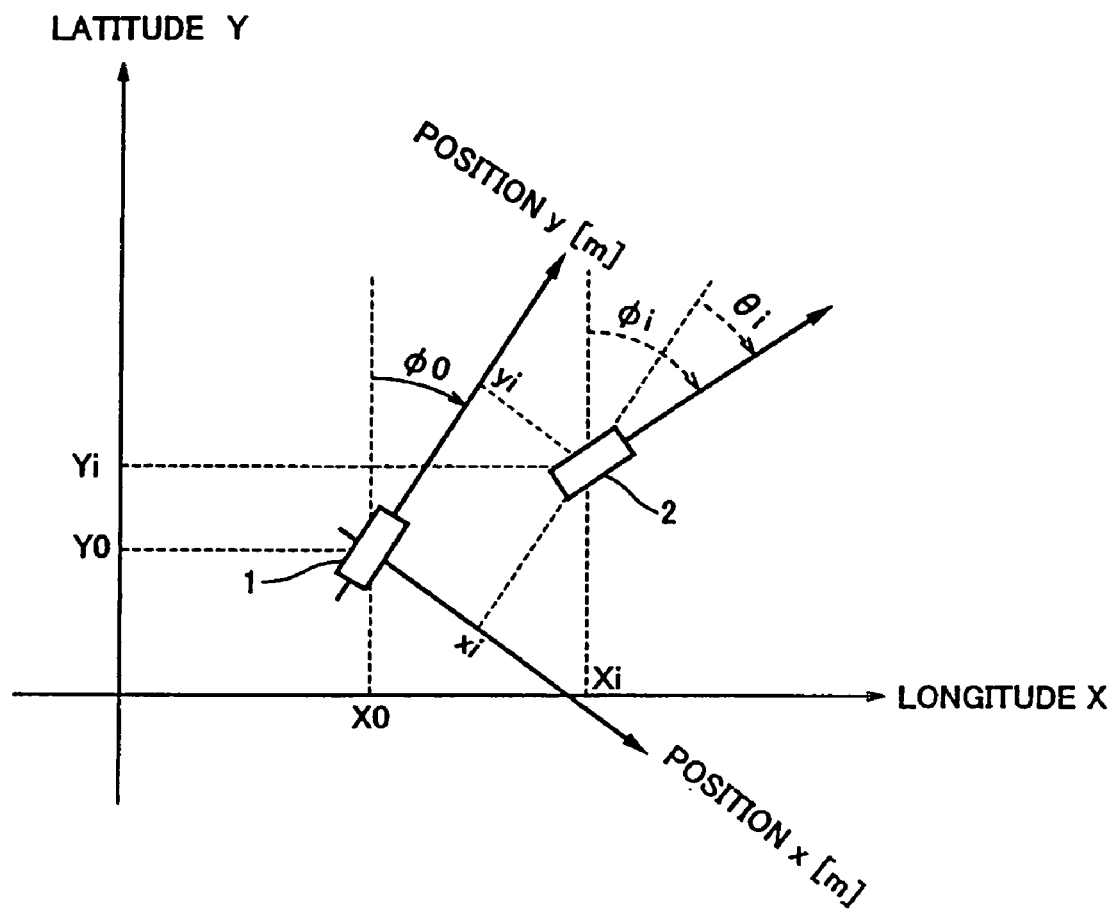
FIG. 3 is a graph showing a method to convert positions, i.e., latitudes and longitudes, and driving directions of a driver's vehicle and an opponent vehicle according to the first embodiment of the present invention.

First of all, in preprocessing, as shown in FIG. 3, the position (latitude and longitude) and the driving direction of the driver's vehicle 1 and each opponent vehicle 2 at each future time tn which have been predicted in step S2 are converted into a x-y coordinate system with the position of the driver's vehicle 1 conforming to an origin of x-y coordinates and the driving direction of the driver's vehicle 1 conforming to a y-axis positive direction. As shown in FIG. 3, when the longitude and the latitude of the driver's vehicle 1 at a future time, and the azimuth angle in the driving direction of the driver's vehicle 1 at the future time are X0 (sec), Y0 (sec) and Φ0 (degree), respectively, and the longitude and the latitude of the opponent vehicle 2 at the future time, and the azimuth angle in the driving direction of the opponent vehicle 2 at the future time are Xi (sec), Yi(sec) and Φi (degree), respectively, the x-coordinate of the position of the opponent vehicle 2 is converted into xi (m), the y-coordinate of the position of the opponent vehicle 2 is converted into yi (m), and the angle of the driving direction of the opponent vehicle 2 with respect to the driving direction of the driver's vehicle 1 (hereinafter referred to as the driving angle of the opponent vehicle 2) is converted into θi (degrees) on the x-y coordinate system. These are calculated according to the following formulae:

$$xi = Kx \times (Xi - X0) \times \cos(Kt \times \phi 0) - Ky \times (Yi - Y0) \times \sin(Kt \times \phi 0)$$

$$yi = Kx \times (Xi - X0) \times \sin(Kt \times \phi 0) + Ky \times (Yi - Y0) \times \cos(Kt \times \phi 0)$$

$$\theta i = \phi i - \phi 0$$

where Kx is a conversion factor to convert sec (latitude) into m (length unit), Ky is a conversion factor to convert sec (longitude) into m (length unit), and Kt is a conversion factor to convert degrees into radian (rad).

Based on the position (xi, yi) and the driving angle θi of the opponent vehicle 2 at each future time tn that have been calculated in the manner described above, the velocity v0 of the driver's vehicle 1 and the velocity vi of the opponent vehicle 2 at each future time tn, and information as to whether the right blinker and/or the left blinker of the driver's vehicle 1 and each opponent vehicle 2 are in the on-state or in the off-state at the current time t0, the ECU 11 determines whether or not each opponent vehicle 2 is likely to approach the driver's vehicle 1 with respect to the five cases illustrated in FIGS. 4A to 4E. The position (xi, yi) and the driving angle θi of the opponent vehicle 2 at the current time t0 in step S5 may be calculated as in the each future time tn.

In this embodiment, it is estimated that the velocity v0 and the driving direction Φ 0 of the driver's vehicle 1 at each future time tn are identical to the velocity and the driving direction of the driver's vehicle 1 at the current time t0, and the velocity vi and the driving direction Φ i of the opponent vehicle 2 at each future time tn are identical to the velocity and the driving direction of the opponent vehicle 2 at the current time t0. Such estimation can decrease a load on calculation executed by the ECU 11, but is merely exemplary. Alternatively, the ECU 11 may calculate an acceleration from the velocity of the driver's vehicle 1 obtained at t-second intervals and calculate the velocity v0 of the driver's vehicle 1 at each future time tn considering the acceleration. In the same manner, the ECU 11 may calculate an acceleration from the velocity of the opponent vehicle 2 obtained at t-second intervals and calculate the velocity vi of the opponent vehicle 2 at each future time tn considering the acceleration. In a further alternative, the ECU 11 may calculate an angular velocity from a fluctuation component in the driving direction of the driver's vehicle 1 obtained at t-second intervals, and may calculate the driving direction Φ0 of the driver's vehicle 1 at each future time tn considering the angular velocity. In the same manner, the ECU 11 may calculate an angular velocity from a fluctuation component in the driving direction of the opponent vehicle 2 obtained at t-second intervals, and may calculate the driving direction Φi of the opponent vehicle 2 at each future time tn considering the angular velocity.

[Case 1]

In case 1, as shown in FIG. 4A, the opponent vehicle 2 is running forward and substantially in the same direction as the driver's vehicle 1. In case 1, it is assumed that the event that the driver's vehicle 1 approaches the opponent vehicle 2 from behind, the event that the driver's vehicle 1 (e.g., two-wheeled vehicle) approaches the opponent vehicle 2 when the opponent vehicle 2 turns left, or the event that the opponent vehicle 2 approaches the driver's vehicle 1 when the opponent vehicle 2 changes the lane will occur.

[Condition for Determination as to Vehicle Approach in Case 1]

Using the position (xi, yi), the driving angle θi, and the velocity vi of an arbitrary opponent vehicle 2 at each future time tn, the information as to whether the right blinker and/or the left blinker of that opponent vehicle 2 are in the on-state or in the off-state, and the velocity v0 of the driver's vehicle 1 at each future time tn, the ECU 11 determines whether or not the following conditions (1) to (4) are met. If it is determined that all of the conditions (1) to (4) are met, the ECU 11 determines that the associated opponent vehicle 2 is likely to cause the events assumed in case 1:

$$|xi| \leq xa \tag{1}$$

$$0 \leq yi \leq ya \tag{2}$$

$$|\theta i| \leq \theta a \tag{3}$$

$$vi \leq v0 - v\text{diff1} \text{ or } vi \leq va \tag{4}$$

where xa, ya, θa, vdiff1, and va are set values pre-stored in the ROM 4 or the like in the ECU 11. For example, xa=1 to 30(m), ya=10 to 200(m), θa=0 to 45 degrees, vdiff1=0 to 10 (km/h) when the right blinker or the left blinker of the opponent vehicle 2 is in the on-state, vdiff1=0 to 20 (km/h) when the right blinker and/or the left blinker of the opponent vehicle 2 are in an off-state, and va=−1 to 20 (km/h). For example, when xa=5 (m), ya=200 (m), θa=20 degrees, vdiff1=10 (km/h) when the right blinker or the left blinker of the opponent vehicle 2 is in the on-state, vdiff1=20 (km/h) when the right blinker and/or the left blinker of the opponent vehicle 2 are in the off-state, and va=20 (km/h), the position of the opponent vehicle 2 is: |xi| is 5 m or less and yi is not less than 0 m and not more than 200 m, and the absolute value of the driving angle θi of the opponent vehicle 2 is 20 degrees or less, which are a common condition. If this common condition is met, the left blinker of the opponent vehicle 2 is in the on-state and the velocity vi of the opponent vehicle 2 and the velocity v0 of the driver's vehicle 1 meet the relationship vi≦v0−10, it is assumed that the event that the vehicles approach during left turn or change of the lane is likely to occur, and therefore the ECU 11 determines that the associated opponent vehicle 2 is likely to approach the driver's vehicle 1. If the common condition is met, the right blinker of the opponent vehicle 2 is in the on-state and the velocity vi of the opponent vehicle 2 and the velocity v0 of the driver's vehicle 1 meet the relationship vi≦v0−10, it is assumed that the event that the vehicles approach during change of the lane is likely to occur, and therefore the ECU 11 determines that the associated opponent vehicle 2 is likely to approach the driver's vehicle 1. If the common condition is met, the right blinker and/or the left blinker of the opponent vehicle 2 are in the off-state and the velocity vi of the opponent vehicle 2 and the velocity v0 of the driver's vehicle 1 meet the relationship vi≦v0−20, it is assumed that the event that the driver's vehicle 1 approaches the opponent vehicle 2 from behind is likely to occur, and therefore the ECU 11 determines that the opponent vehicle 2 is likely to approach the driver's vehicle 1. If the common condition is met, the velocity vi of the opponent vehicle 2 is a low velocity (including stop) of 20 km/h or less regardless of whether the blinker of the opponent vehicle 2 is in the on-state or in the off-state, it is assumed that the event that the driver's vehicle 1 approaches the opponent vehicle 2 from behind is likely to occur, and therefore the ECU 11 determines that the opponent vehicle 2 is likely to approach the driver's vehicle 1.

The parameters of xa, ya, θa, vdiff1, and va may be set to vary according to the velocity of the opponent vehicle 2 or the driver's vehicle 1 at the current time.

The event associated with the left turn is assumed on premise that the vehicles keep to the left according to a traffic rule in Japan, and is not assumed that the vehicles keep to the right. In that case, it is assumed whether or not the vehicles are likely to approach during change of the lane or during right turn, i.e., the driver's vehicle 1 approaches the opponent vehicle 2 when the opponent vehicle 2 running forward turns right, in the condition in which the right blinker of the opponent vehicle 2 is in the on-state and the vehicles are likely to approach during change of the lane. In any cases, the above condition for determination as to vehicle approach is not changed.

[Case 2]

In case 2, as shown in FIG. 4B, the opponent vehicle 2 running from substantially opposite direction is approaching the driver's vehicle 1 from forward. In case 2, it is assumed that the event that the vehicles approach when the driver's vehicle 1 is running straight ahead and the opponent vehicle 2 is turning right (event A) and the event that the vehicles approach when the opponent vehicle 2 is running straight ahead and the driver's vehicle 1 is turning right (event B) will occur.

[Condition for Determination as to Vehicle Approach in Case 2]

Using the position (xi, yi), the driving angle θi, and the velocity vi of an arbitrary opponent vehicle 2 at each future time tn, and the information as to whether the right blinkers of that opponent vehicle 2 or/and the driver's vehicle 1 is/are in the on-state or in the off-state at the current time t0, the ECU 11 determines whether or not the following conditions (1) to (4) are met. If it is determined that all of the conditions (1) to (4) are met, the ECU 11 determines that the associated opponent vehicle 2 is likely to cause the events assumed in case 2:

$$|xi| \leq xb, \text{ or } |xi - yi \cdot \tan \theta i| \leq xb \quad (1)$$

$$0 = yi \leq yb \quad (2)$$

$$|\theta i - 180| \leq \theta b \quad (3)$$

$$vi \geq vb \quad (4)$$

The two formulae (1) allow for the event that the opponent vehicle 2 is approaching directly from forward or from obliquely forward. In the formulae (1) to (4), xb, yb, θb, and vb are set values pre-stored in the ROM 4 or the like in the ECU 11. For example, xb=1 to 30 (m), yb=10 to 200 (m), θb=0 to 45 degrees, vb=0 to 10 (km/h) when the right blinker of the opponent vehicle 2 is in the on-state, and vb=10 to 30 (km/h) when the right blinker of the driver's vehicle 1 is in the on-state. For example, when xb=5 (m), yb=200 (m), θb=20 degrees, vb=0 (km/h) when the right blinker of the opponent vehicle 2 is in the on-state, and vb=30 (km/h) when the right blinker of the driver's vehicle 1 is in the on-state, the position of the opponent vehicle 2 is: |xi| is 5 m or less, or |xi−yi·tan θi|≦5 m, yi is not less than 0 m and not more than 200 m, and the value of |θi−180| regarding the driving angle θi is 20 degrees or less, which are a common condition. If this common condition is met, the right blinker of the opponent vehicle 2 is in the on-state and the velocity vi of the opponent vehicle 2 is 0 km/h or more, it is assumed that the event A is likely to occur, and therefore the ECU 11 determines that the associated opponent vehicle 2 is likely to approach the driver's vehicle 1. If the common condition is met, the right blinker of the driver's vehicle 1 is in the on-state and the velocity vi of the opponent vehicle 2 is 30 km/h or more, it is assumed that the event B is likely to occur, and therefore the ECU 11 determines that the associated opponent vehicle 2 is likely to approach the driver's vehicle 1.

The parameters of xb, yb, θb, vb may be set to vary according to the velocity of the opponent vehicle 2 or the driver's vehicle 1 at the current time.

The event associated with the right turn is assumed on premise that the vehicles keep to the left according to the traffic rule in Japan, and are not assumed when the vehicles keep to the right. In this case, in the vehicle approach condition associated with the event A, the condition in which the right blinker of the opponent vehicle 2 is in the on-state is replaced by the condition in which the left blinker of the opponent vehicle 2 is in the on-state. If this vehicle approach condition is met, it may be assumed that the vehicles are likely to approach when the driver's vehicle 1 is running straight ahead and the opponent vehicle 2 is turning left, and the ECU 11 may determine that the associated opponent vehicle 2 is likely to approach the driver's vehicle 1. Also, in the vehicle approach condition associated with the event B, the condition in which the right blinker of the driver's vehicle 1 is in the on-state is replaced by the condition in which the left blinker of the driver's vehicle 1 is in the on-state. If this vehicle approach condition is met, it may be assumed that the vehicles are likely to approach when the opponent vehicle 2 is running straight ahead and the driver's vehicle 1 is turning left, and the ECU 11 may determine that the associated opponent vehicle 2 is likely to approach the driver's vehicle 1.

[Case 3]

In case 3, as shown in FIG. 4C, the opponent vehicle 2 is running behind the driver's vehicle 1 and in substantially the same direction. In case 3, it is assumed that the event that the opponent vehicle 2 approaches the driver's vehicle 1 from behind, the event that the opponent vehicle 2 (e.g., two-wheeled vehicle) approaches the driver's vehicle 1 when the driver's vehicle 1 turns left, or the event that the driver's vehicle 1 approaches the opponent vehicle 2 when the driver's vehicle 1 changes the lane, will occur.

[Condition for Determination as to Vehicle Approach in Case 3]

Using the position (xi, yi), the driving angle θi, and the velocity vi of an arbitrary opponent vehicle 2 at each future time tn, the information as to whether the right blinker and/or the left blinker of the driver's vehicle 1 are in the on-state or in the off-state at the current time t0, and the velocity v0 of the driver's vehicle 1 at each future time tn, the ECU 11 determines whether or not the following conditions (1) to (4) are met. If it is determined that all of the conditions (1) to (4) are met, the ECU 11 determines that the associated opponent vehicle 2 is likely to cause the events assumed in case 3:

$$|xi| \leq xc, \text{ or } |xi - yi \cdot \tan \theta i| \leq xc \quad (1)$$

$$-yc \leq yi \leq 0 \quad (2)$$

$$|\theta i| \leq \theta c \quad (3)$$

$$vi \geq v0 + vdiff3 \quad (4)$$

The two formulae (1) allow for the event that the opponent vehicle 2 approaches the driver's vehicle 1 directly from behind or from obliquely backward. In the formulae (1) to (4), xc, yc, θc, and vdiff3, are set values pre-stored in the ROM 4 or the like in the ECU 11. For example, xc=1 to 30 (m), yc=10 to 200 (m), θc=0 to 45 degrees, vdiff3=0 to 10 (km/h) when the right blinker or the left blinker of the driver's vehicle 1 is in the on-state, and vdiff3=0 to 20 (km/h) when the right blinker and/or the left blinker of the driver's vehicle 1 are in the off-state. For example, when xc=5 (m), yc=200 (m), θa=20 degree, vdiff3=10 (km/h) when the right blinker or the left blinker of the driver's vehicle 1 is in the on-state, and vdiff3=20 (km/h) when the right blinker and/or the left blinker of the driver's vehicle 2 are in the off-state, the position of the opponent vehicle 2 is: |xi| is 5 m or less or |xi−yi·tan θi|≦5, and yi is not less than −200 m and not more than 0 m, and the absolute value of the driving angle |θi| is 20 degrees or less, which are a common condition. If this common condition is met, the left blinker of the driver's vehicle 1 is in the on-state and the velocity vi of the opponent vehicle 2 and the velocity v0 of the driver's vehicle 1 meet the relationship vi≧v0+10, it is assumed that the event that the vehicles approach during left turn or change of the lane is likely to occur, and therefore the ECU 11 determines that the associated opponent vehicle 2 is likely to approach the driver's vehicle 1. If the common condition is met, the left blinker of the driver's vehicle 1 is in the on-state and the velocity vi of the opponent vehicle 2 and the velocity v0 of the driver's vehicle 1 meet the relationship vi≦v0+10, it is assumed that the event that the vehicles approach during change of the lane is likely to occur, and therefore the ECU 11 determines that the associated opponent vehicle 2 is likely to approach the driver's vehicle 1. If the common condition is met, the right blinker and/or the left blinker of the driver's vehicle 1 are in the off-state, and the velocity vi of the opponent vehicle 2 and the velocity v0 of the driver's vehicle 1 meet the relationship vi≦v0+20, it is assumed that the event that the opponent vehicle 2 approaches the driver's vehicle 1 from behind is likely to occur, and therefore, the ECU 11 determines that the associated opponent vehicle 2 is likely to approach the driver's vehicle 1.

The parameters of xc, yc, θc, and vdiff3 may be set to vary according to the velocity of the opponent vehicle 2 or the driver's vehicle 1 at the current time.

The event associated with the left turn is assumed on premise that the vehicles keep to the left according to the traffic rule in Japan, and are not assumed when the vehicles keep to the right. In this case, it is assumed that the vehicles are likely to approach during change of the lane or during right turn, i.e., the opponent vehicle 2 approaches the driver's vehicle 1 from behind when the driver's vehicle 1 turns right, in the condition in which the right blinker of the driver's vehicle 1 is in the on-state and the vehicles are likely to approach during change of the lane. In any cases, the above condition for determination is not changed.

[Case 4]

In case 4, as shown in FIG. 4D, the opponent vehicle 2 running forward is approaching the driver's vehicle from leftward. In case 4, it is assumed that the event that the vehicles approach at an intersection will occur.

[Condition for Determination as to Vehicle Approach in Case 4]

Using the position (xi, yi), the driving angle θi, and the velocity vi of an arbitrary opponent vehicle 2 at each future time tn, the ECU 11 determines whether or not the following conditions (1) to (4) are met. If it is determined that all of the conditions (1) to (4) are met, the ECU 11 determines that the associated opponent vehicle 2 is likely to cause the events assumed in the case 4. 3600/1000 in the condition (4) is a numeric value to conform to a unit (km/h) of the velocity vi.

$$xi \leq xd \tag{1}$$

$$|yi| \leq yd, \text{ or } |yi - xi/\tan \theta i| yd \tag{2}$$

$$|\theta i - 90| \leq \theta d \tag{3}$$

$$vi \geq \{-(xi+xd)/td\} \times 3600/1000 \tag{4}$$

The two formulae (2) allow for the event that the opponent vehicle 2 approaches the driver's vehicle 1 from directly lateral (leftward) and the event that opponent vehicle 2 approaches the driver's vehicle 1 from obliquely leftward. In the formulae (1) to (4), xd (xd≧0), yd, θd, and td are set values pre-stored in the ROM 4 or the like in the ECU 11. For example, xd=0 to 50 (m), yd=0 to 50 (m), θd=0 to 45 degrees, and td is variably set according to each future time tn (sec) set at t-second intervals in the time period that lapses T seconds from the current time t0. For example, td is set to meet the formula td=6+(5/T) tn in a period 6 to 11 (sec) (current time t0=0) For example, when xd=10 (m), yd=10 (m), and θd=20 degrees, and when td meets the above formula, the position of the opponent vehicle 2 is: xi is 10 m or less and |yi| is 10 m or less or |yi−xi/tan θi|≦10, and the value of |θi−90| regarding the driving angle θi is 20 degrees or less, and the driving velocity vi of the opponent vehicle 2 meets the condition (4), it is assumed that the event that the opponent vehicle 2 is approaching the driver's vehicle 2 from leftward is likely to occur, and the ECU 11 determines that the associated opponent vehicle 2 is likely to approach the driver's vehicle 1. It should be appreciated that the reason why xd used in the formula (1) is xd≧0 is that the condition has some allowance so that the opponent vehicle 2 approaching from leftward will not be missed because of the presence of a curve of a road or a fluctuation in the driving direction of the driver's vehicle 1.

The parameters of xd, yd, θd, and td may be set to vary according to the velocity of the opponent vehicle 2 or the driver's vehicle 1 at the current time.

[Case 5]

In case 5, as shown in FIG. 4E, the opponent vehicle 2 running forward is approaching the driver's vehicle 1 from rightward. In case 5, it is assumed that the event that the opponent vehicle 2 approaches the driver's vehicle 1 at an intersection will occur.

[Condition for Determination as to Vehicle Approach in Case 5]

Using the position (xi, yi), the driving angle θi, and the velocity vi of an arbitrary opponent vehicle 2 at each future time tn, the ECU 11 determines whether or not the following conditions (1) to (4) are met. If it is determined that all of the conditions (1) to (4) are met, the ECU 11 determines that the associated opponent vehicle 2 is likely to cause the events assumed in the case 5. 3600/1000 in the condition (4) is a numeric value to conform to a unit (km/h) of the velocity vi.

$$-xe \leq xi \tag{1}$$

$$|yi| \leq ye \text{ or } |yi - xi/\tan \theta i| \leq ye \tag{2}$$

$$|\theta i - 270| \leq \theta e \tag{3}$$

$$vi \geq \{(xi-xe)/te\} \times 3600/1000 \tag{4}$$

The two formulae (2) allow for the event that the opponent vehicle 2 approaches the driver's vehicle 1 from directly lateral (rightward) and the event that opponent vehicle 2 approaches the driver's vehicle 1 from obliquely rightward. In the formulae (1) to (4), xe (xe≧0), ye, θe, and te are set values pre-stored in the ROM 4 or the like in the ECU 11. For example, xe=0 to 50 (m), ye=0 to 50 (m), θe=0 to 45 degrees, and te is variably set according to each future time tn (sec) set at t-second intervals in the time period that lapses T seconds from the current time t0. For example, te is set so that the relationship te=6+(5/T)tn (current time t0=0) in a period 6 to 11 (sec). For example, when xe=10 (m), ye=10 (m), and θe=20 degrees and te meets the above formula, the position of the opponent vehicle 2 is: xi is −10 m or more and |yi| is 10 m or less or |yi−xi/tan θi|≦10, the value of |θi−270| regarding the driving angle θi is less than 20 degrees, and the velocity vi(km/h) of the opponent vehicle 2 meets the condition (4), it is assumed that the event that the opponent vehicle 2 is approaching the driver's vehicle 2 from rightward is likely to occur, and the ECU 11 determines that that the opponent vehicle 2 is likely to approach the driver's vehicle 1. It should be appreciated that the reason why xe of (-xe) used in the formula (1) is xe≧0 is that the condition has some allowance so that the opponent vehicle 2 approaching from rightward will not be missed because of the presence of the curve of the road or fluctuation in the driving direction of the driver's vehicle 1.

The parameters of xe, ye, θe and te may be set to vary according to the velocity of the opponent vehicle 2 or the driver's vehicle 1 at the current time.

When the ECU 11 determines whether or not the arbitrary one opponent vehicle 2 and the driver's vehicle 1 are likely to approach each other at a future time tx in step S3, the position (xi, yi), the driving angle θi, and the velocity vi of the opponent vehicle 2 at the future time (time tx) are at least used. In step S3, the ECU 11 determines whether or not each opponent vehicle 2 is likely to approach the driver's vehicle 1 with respect to each of the five cases. In this case, the ECU 11 determines whether or not an arbitrary opponent vehicle 2 is likely to approach the driver's vehicle 1 for the five cases at every future time sequentially from the future time closest to the current time. The ECU 11 decides that the future time when the arbitrary opponent vehicle 2 is likely to approach the driver's vehicle I in a case as the time when that opponent vehicle 2 is likely to approach the driver's vehicle 1, and terminates determination for that opponent vehicle 2. Thereafter, the ECU 11 does not make determination. Alternatively, determination order may be preset for the five cases, for example, the following order: case 1, case 2, case 3, case 4, and case 5. And, the ECU 11 may determine whether or not an arbitrary opponent vehicle 2 is likely to approach the driver's vehicle 1 with respect to each of the five cases at every future time sequentially from the future time closest to the current time, decide that the future time when the arbitrary opponent vehicle 2 is determined to be likely to approach the driver's vehicle 1 as the time when that opponent vehicle 2 is likely to approach the driver's vehicle 1, and terminate determination for that opponent vehicle 2. Thereafter, the ECU 11 does not make determination.

If it is determined that plural opponent vehicles 2 are likely to approach the driver's vehicle 1 in the above five cases in step S3, in step S4, the ECU 11 decides one opponent vehicle 2 whose future time when it is likely to approach the driver's vehicle 1 is the earliest. If it is determined that there are plural opponent vehicles 2 that are likely to approach the driver's vehicle 1 at the earliest future time, the ECU 11 decides one opponent vehicle 2 running at the lowest velocity at the current time t0 with respect to the case 1, and decides one opponent vehicle 2 running at the highest velocity at the current time t0 with respect to the cases 2 to 5. If it is determined that there are plural opponent vehicles with an equal velocity in the same case, the ECU 11 decides one opponent vehicle 2 according to the type of vehicle in the following order: two-wheeled vehicle, ordinary motor vehicle, and large-sized vehicle. If it is determined that there are plural opponent vehicles of the same type, the ECU 11 decides one opponent vehicle 2 with a shortest distance from the driver's vehicle 1. If it is determined that there are not plural opponent vehicles 2 which are likely to approach the driver's vehicle 1 with respect to the five cases, the ECU 11 advances the process to step S5.

Figure 5A:
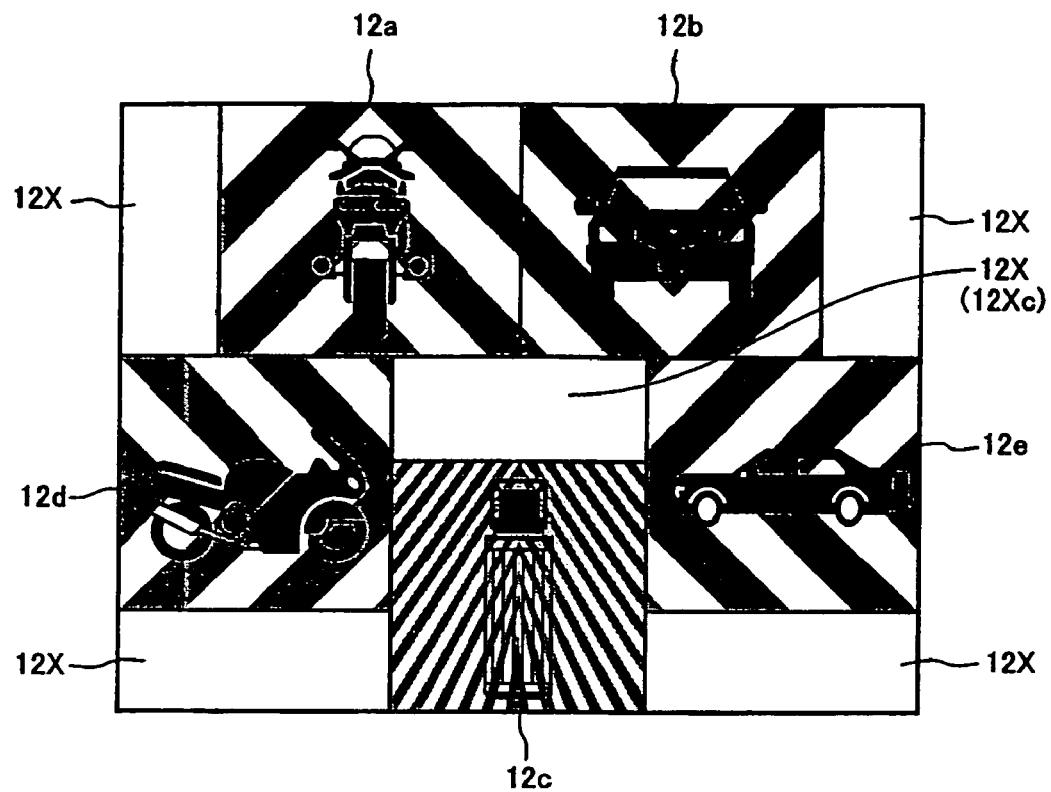
FIGS. 5A and 5B are views showing an example of a screen of a display device according to the first embodiment of the present invention.
Figure 5B:
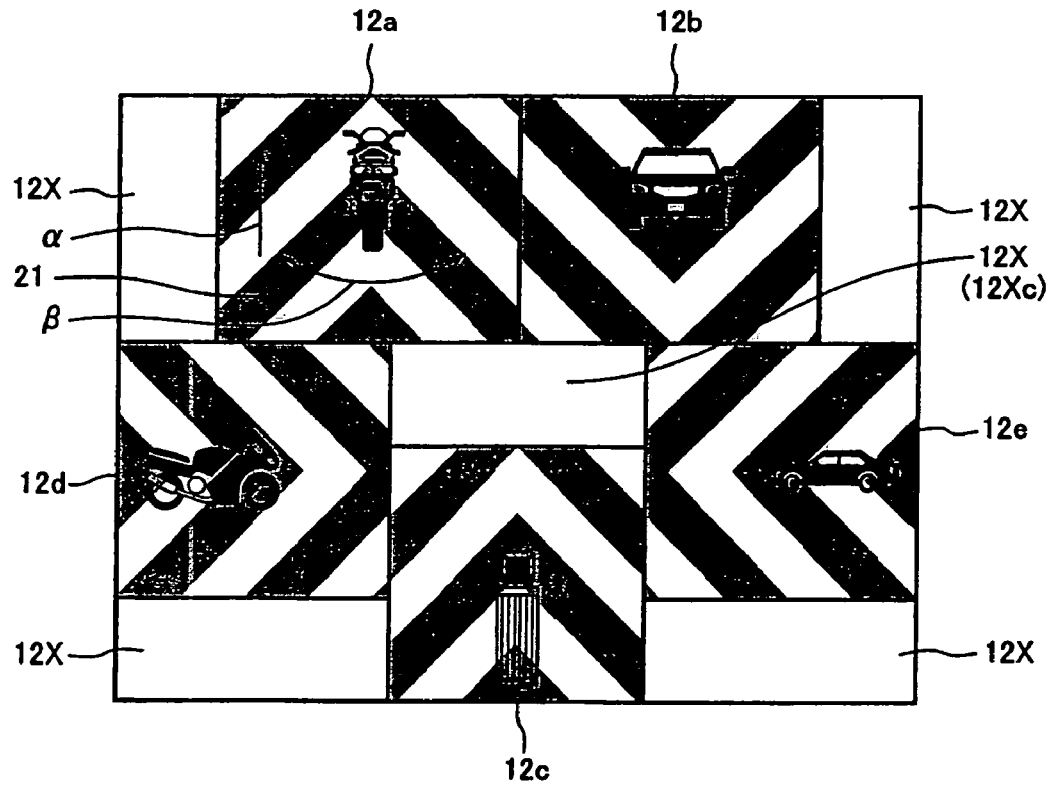

In step S5, the ECU 11 causes the display device 12 to display the opponent vehicles 2 which have been determined to be likely to approach the driver's vehicle 1 based on the results of step S3 and step S4. In step S5, using the information of the type of the opponent vehicles 2 which are likely to approach the driver's vehicle 1 (obtained in step S1), the opponent vehicles 2 are displayed by icons according to the types. This display method will be described. FIGS. 5A and 5B are views showing examples of a display screen of the display device 12. In the examples, the display screen is divided into five determination display regions 12a to 12e and blank regions 12X. The determination display region 12a displays the opponent vehicle 2 that is likely to approach the driver's vehicle 1 in the case 1. The determination display region 12b displays the opponent vehicle 2 that is likely to approach the driver's vehicle 1 in the case 2. The determination display region 12c displays the opponent vehicle 2 that is likely to approach the driver's vehicle 1 in the case 3. The determination display region 12d displays the opponent vehicle 2 that is likely to approach the driver's vehicle 1 in the case 4. The determination display region 12e displays the opponent vehicle 2 that is likely to approach the driver's vehicle 1 in the case 5. The blank regions 12X may be configured to display any information as necessary or not to display any information. Assuming that the driver's vehicle 1 is located in a blank region 12Xc at a center region of the display screen, among the regions 12X, the positional relationship between the driver's vehicle 1 and the opponent vehicles 2 in the five cases is substantially reflected in the positional relationship between the assumed driver's vehicle 1 located at the region 12Xc at the center region of the screen and the opponent vehicles 2 displayed on the determination display regions 12a to 12e. Whereas in this embodiment, the traffic rule defines that the vehicles keep to the left, it is desirable to change the display regions between the case 1 and the case 2, that is, the determination display region 12a displays the opponent vehicle 2 that is likely to approach the driver's vehicle 1 in the case 2 and the determination display region 12b displays the opponent vehicle 2 that is likely to approach the driver's vehicle 1 in the case 1 if the traffic rule defines that the vehicles keep to the right.

In FIGS. 5A and 5B, the determination display regions 12a and 12d display the icons indicating that the opponent vehicles 2 are two-wheeled vehicles, the determination display regions 12b and 12e display the icons indicating that the opponent vehicles 2 are ordinary motor vehicles, and the determination display region 12c displays the icon indicating that the opponent vehicle 2 is a truck. The determination display region 12a displays the icon of the opponent vehicle 2 as viewed from backward. The determination display region 12b displays the icon of the opponent vehicle 2 as viewed from forward. The determination display region 12c displays the icon of the opponent vehicle 2 as viewed from above. The determination display region 12d displays the icon indicating that the opponent vehicle 2 is running rightward as viewed from the side. The determination display region 12e displays the icon indicating that the opponent vehicle 2 is running leftward as viewed from the side.

These icons are displayed in different sizes according to the distance between the driver's vehicle 1 and the opponent vehicle 2 in x-direction or in y-direction at the current time t0. As shown in FIG. 3, by converting the positions of the driver's vehicle 1 and the opponent vehicle 2 into the x-y coordinate system with the driving direction of the driver's vehicle 1 conforming to the y-axis direction and the position of the driver's vehicle I conforming to the origin of the x-y coordinates, the distance in the x-direction which is the absolute value of the x-coordinate of the opponent vehicle 2 and the distance in the y-direction which is the absolute value of the opponent vehicle 2 are obtained. Therefore, the distance in the x-direction between the driver's vehicle 1 and the opponent vehicle 2 at the current time t0 is obtained by calculating the absolute value |xi| of the position xi of the opponent vehicle 2 at the current time t0 and the distance in the y-direction between the driver's vehicle 1 and the opponent vehicle 2 at the current time t0 is obtained by calculating the absolute value |yi| of the position yi of the opponent vehicle 2 at the current time t0. With respect to the opponent vehicles 2 that have been determined to be likely to approach the driver's vehicle 1 in the case 1, the case 2, and the case 3, the ECU 11 compares the distance |yi| in the y-direction at the current time t0 to a preset threshold yt. When it is determined that |yi|<yt (the distance in the y-direction is small), the ECU 11 causes the display device 12 to display a large-sized icon, whereas when it is determined that |yi|≧yt (the distance in the y-direction is large), the ECU 11 causes the display device 12 to display a small-sized icon. The threshold yt is set in, for example, a range of 50 to 150 (m). The threshold yt is set to vary according to the velocity of the driver's vehicle 1 or the opponent vehicle 2. The thresholds yt for the case 1, the case 2, and the case 3 may have different values. In step S5, with respect to the opponent vehicles 2 that have been determined to be likely to approach the driver's vehicle 1 in the case 4 and the case 5, the ECU 11 compares the distance |xi| in the x-direction at the current time t0 to a preset threshold xt. When it is determined that |xi|<xt (the distance in the x-direction is small), the ECU 11 causes the display device 12 to display the large-sized icon, whereas when it is determined that |xi|≧xt (the distance in the x-direction is large), the ECU 11 causes the display device 12 to display the small-sized icon. The thresholds xt is set in, for example, 50 to 150 (m). The threshold xt is set to vary according to the velocity of the driver's vehicle 1 or the opponent vehicle 2. The thresholds xt for the case 4 and the case 5 may have different values. The thresholds yt and xt are pre-stored in the ROM 4 or the like in the ECU 11. FIG. 5A illustrates that the determination display regions 12a to 12e display large-sized icons and FIG. 5B illustrates that the determination display regions 12a to 12e display small-sized icons.

Whereas two types of icons, i.e., the large-sized and small-sized icons of the respective types of the opponent vehicles 2 are used as the icons displayed on the determination display regions 12a to 12e, three or more types of icons may alternatively be used in the same manner. For example, a large-sized icon, a medium-sized icon, and a small-sized icon, may be used as the icons displayed on the determination display regions 12a to 12e, and two thresholds yt1 and yt2 may be preset for the case 1, the case 2, and the case 3. And, when it is determined that that |yi|<yt1, the ECU 11 may cause the display device 12 to display the large-sized icon. When it is determined that yt1≦|yi|<yt2, the ECU 11 may cause the display device 12 to display the medium-sized icon. When it is determined that |yi|≧yt2, the ECU 11 may cause the display device 12 to display the small-sized icon. Likewise, two thresholds xt1 and xt2 may be preset for the case 4 and the case 5. And, when it is determined that |xi|<xt1, the ECU 11 may cause the display device 12 to display the large-sized icon. When it is determined that xt1≦|xi|<xt2, the ECU 11 may cause the display device 12 to display the medium-sized icon. When it is determined that |xi|≧xt2, the ECU 11 may cause the display device 12 to display the small-sized icon. In further alternative, the size of the icon may be varied sequentially according to sequential variation in the value of |yi| in such a manner that the size of the icon increases as the value of |yi| decreases with respect to the case 1, the case 2, and the case 3. In addition, the size of the icon may be varied sequentially according to sequential variation in the value of |xi| in such a manner that the size of the icon increases as the value of |xi| decreases with respect to the case 4 and the case 5.

In further alternative, the size of the icon may be varied according to a direct distance between the driver's vehicle 1 and the opponent vehicle 2 at the current time t0. In this case, in step S5, with respect to the opponent vehicles 2 that have been determined to be likely to approach the driver's vehicle 1 in the case 1, the case 2, the case 3, the case 4, and the case 5, the ECU 11 calculates the direct distance $ri=(xi^2+yi^2)^{1/2}$ using the position (xi, yi) of the opponent vehicle 2 at the current time t0, and compares the distance ri to a preset threshold rt. If it is determined that ri<rt (direct distance is small), the ECU 11 causes the display device 12 to display the large-sized icon, whereas when it is determined that ri≧rt (direct distance is large), the ECU 11 causes the display device 12 to display the small-sized icon. The threshold rt may be set in, for example, 50 to 150 (m). The thresholds rt may be set to vary according to the velocity of the driver's vehicle 1 or the opponent vehicle 2. The thresholds rt for the case 1, the case 2, the case 3, the case 4, and the case 5 may have different values. The thresholds rt may be pre-stored in the ROM 4 or the like in the ECU 11. In this case, also, the three or more types of icons of the respective opponent vehicles 2 may be used in the same manner. For example, a large-sized icon, a medium-sized icon, and a small-sized icon, may be used, and two thresholds rt1 and rt2 may be preset. And, when it is determined that ri<rt1, the ECU 11 may cause the display device 12 to display the large-sized icon. When it is determined that rt1≦ri<rt2, the ECU 11 may cause the display device 12 to display the medium-sized icon. When it is determined that ri≧rt2, the ECU 11 may cause the display device 12 to display the small-sized icon. In further alternative, the size of the icon may be varied sequentially according to sequential variation in the value of ri in such a manner that the size of the icon increases as the value of ri decreases.

The icons indicating the opponent vehicles 2 that have been determined to be likely to approach the driver's vehicle 1 in the case 1, the case 2, and the case 3 may be displayed so as to vary the size according to the y-direction distance between the driver's vehicle 1 and the opponent vehicle 2 at the current time t0, whereas the icons indicating the opponent vehicles 2 that have been determined to be likely to approach the driver's vehicle 1 in the case 4 and the case 5 may be displayed so as to vary the size according to the direct distance between the driver's vehicle 1 and the opponent vehicle 2 at the current time t0.

When the distance between the driver's vehicle 1 and the opponent vehicle 2 is small, the corresponding icon is disposed closer to the center of the screen, whereas when the distance between the driver's vehicle 1 and the opponent vehicle 2 is large, the icon is disposed away from the center of the screen. This enables driver to easily visually recognize how the opponent vehicle 2 is distant from the driver's vehicle 1.

The determination display regions 12a to 12e display V-shaped stripe patterns as background images of the icons. In the stripe patterns, the closing direction of the V-shape (direction of arrow a in the determination display region 12a of FIG. 5B) indicates the driving direction of the opponent vehicle 2 at the current time t0. The driving direction of the opponent vehicle 2 may be a precise direction decided based on the driving angle θi (see FIG. 3) of the opponent vehicle 2 at the current time t0, or may be pre-decided for each of the determination display regions 12a to 12e. For example, the closing direction of the V-shape may be decided in advance in such a manner that the closing direction of the V-shape is upward in the determination display region 12a and the determination display region 12c, the closing direction of the V-shape is downward in the determination display region 12b, the closing direction of the V-shape is rightward in the determination display region 12d, and the closing direction of the V-shape is leftward in the determination display region 12e.

According to the velocity of the opponent vehicle 2 at the current time t0, the width and spacing of the stripe and an angle of the V-shape (angle β of the V-shape of a stripe 21 in the determination display region 12a of FIG. 5B) is varied. So, in step S5, with respect to the opponent vehicles 2 that have been determined to be likely to approach the driver's vehicle 1 in the case 1 to 5, the ECU 11 compares the velocity vi of the opponent vehicle 2 at the current time t0 to a preset threshold vt. When it is determined that vi<vt, the ECU 11 causes the display device 12 to display the stripe pattern indicating a low velocity, whereas when it is determined that vi≧vt, the ECU 11 causes the display device 12 to display the stripe pattern indicating a high velocity. The threshold vt may be set in, for example, a range of 30 to 50 (km/h). The threshold vt may be set to vary according to the velocity of the driver's vehicle 1. The thresholds vt for the case 1 to 5 may have different values. The threshold vt may be pres-stored in the ROM 4 or the like in the ECU 11. As shown in FIG. 5A, the determination display region 12c displays the stripe pattern indicating that the opponent vehicle 2 is running at a high velocity, and the determination display regions 12a, 12b, 12d, and 12e display the stripe pattern indicating that the opponent vehicles 2 are running at a low velocity. That is, to indicate that the opponent vehicle 2 is running at a high velocity, the width and spacing of the stripe and the angle of the V-shape are made smaller, whereas to indicate that the opponent vehicle 2 is running at a low velocity, the width and spacing of the stripe and the angle of the V-shape are made larger. Other stripe patterns may be used so long as the driver can easily visually recognize the velocity of the opponent vehicle 2. For example, the angle of the V-shape may be set equal regardless of whether the velocity is high or low, and to indicate the high velocity, the width and/or spacing of the stripes may be set smaller, whereas to indicate the low velocity, the width and/or spacing of the stripes may be set larger. Or, the width and spacing of the stripes may be set equal regardless of whether the velocity is high or low, and to indicate the high velocity, the angle of the V-shape may be set smaller, whereas to indicate the low velocity, the angle of the V-shape may be set larger. As described above, the background patterns desirably indicate the driving direction of the opponent vehicles 2.

Whereas the two types of stripe patterns according to the velocity may be used, three or more types of stripe patterns may alternatively be used according to the velocity in the same manner. For example, two thresholds vt1 and vt2 may be preset. And, when it is determined that vi<vt1, the ECU 11 may cause the display device 12 to display the stripe pattern indicating that the opponent vehicle 2 is running at a low velocity. When it is determined that vt1≦vi<vt2, the ECU 11 causes the display device 12 to display the stripe pattern indicating that the opponent vehicle 2 is running at a medium velocity. When it is determined that vi≧vt12, the ECU may cause the display device 12 to display the stripes indicating that the opponent vehicle 2 is running at a high velocity.

As shown in FIG. 5A and 5B, all of the five determination display regions 12a to 12e display the icons and the stripe pattern as the background images. This means that there exist opponent vehicles 2 that have been determined to be likely to approach the driver's vehicle 1 in all of the five cases. If there are not any opponent vehicle 2 that has been determined to be likely to approach the driver's vehicle 1 in any one of the case 1 to 5, the associated determination display region does not display any information.

As described above, on the screen of the display device 12, the determination display regions 12a to 12e corresponding to the five cases 1 to 5 are disposed, the icons indicating the driving directions of the opponent vehicles 2 are displayed on the determination display regions 12a to 12e, and the stripe patterns indicating the driving directions of the opponent vehicles 2 are displayed on the determination display regions 12a to 12e so that the positional relationship between the driver's vehicle 1 and the opponent vehicle 2 in each of the cases 1 to 5 is clearly seen. With such a configuration, the driver can easily recognize that from what direction the opponent vehicle 2 is approaching the driver's vehicle 1 by glancing at the image displayed on the screen of the display device 12. In addition, since the icons according to the vehicle type are displayed, the driver can easily find the opponent vehicle 2 that is likely to approach the driver vehicle 1 on the road. Furthermore, the driver can easily recognize the distance to the opponent vehicle 2 that is likely to approach the driver's vehicle 1 based on the size of the icon. Moreover, the driver can easily substantially recognize the driving direction of the opponent vehicle 2 that is likely to approach the driver's vehicle 1 based on the shape of the stripe patterns (width and spacing of the stripes and the angle of the V-shape) as the background image.

In this embodiment, because information of the road map is not displayed the ECU 11 is able to determine or predict whether or not the opponent vehicle 2 is likely to approach the driver's vehicle 1 without substantially increasing the volume of data to be processed. In addition, since the determination display regions 12a to 12e do not display the road map and so on but display simple images including the icons indicating the opponent vehicles 2 that are likely to approach the driver's vehicle 1 and the stripe patterns according to the velocities and driving directions of the opponent vehicles 2 as the background image, the information can be effectively shown to the driver impressively. In addition, since the display device 12 is configured to display a simple image as described above, it can be small-sized. The display device 12 can be easily mounted into the two-wheeled vehicles into which a large screen device such as a car navigation is difficult to mount. The display device 12 may be positioned to enable the driver to easily check the screen, for example, in the vicinity of a speed meter or gauge attached near a substantially center position of a handle when mounted into the motorcycle. The display device 12 may be positioned to enable the driver to easily check the screen when mounted into the ordinary motor vehicle and the large-sized vehicles having sufficient spaces.

The effects produced by displaying the opponent vehicles 2 that are likely to approach the driver's vehicle 1 on the display device 12 as illustrated in FIG. 5A and 5B, may be achieved by any other suitable vehicle approach determination methods.

Second Embodiment

An information provision apparatus according to a second embodiment of the present invention will be described. As in the first embodiment, a configuration of the information provision apparatus 10 of the second embodiment is illustrated by the block diagram of FIG. 1. Since the operation of the second embodiment is identical to that of the first embodiment except that the ECU 11 determines whether or not the probability that the opponent vehicle 2 is approaching the driver's vehicle 1 is high, it will not be further described. Now, the distinction between the first embodiment and second embodiment will be described.

Figure 6:
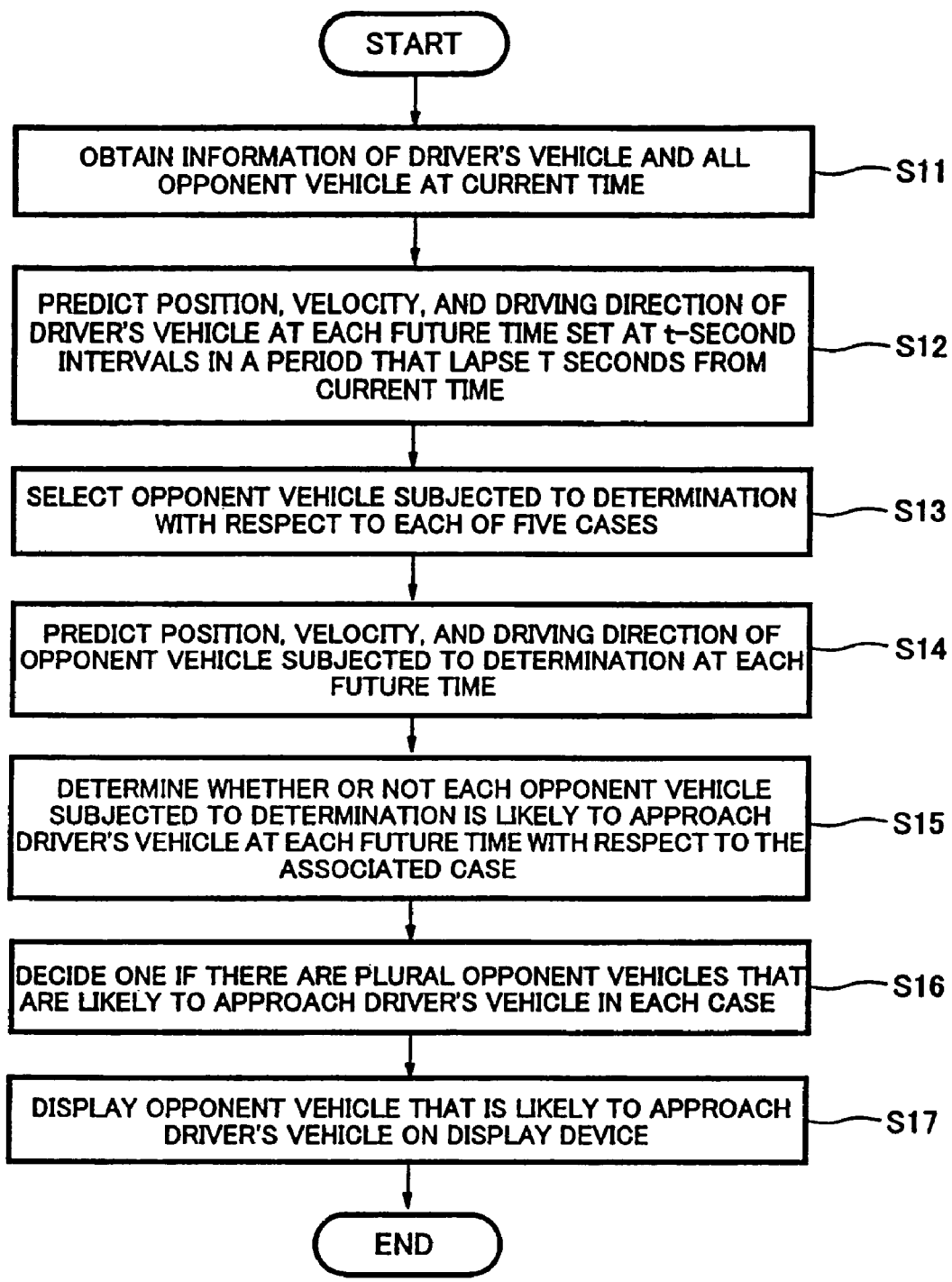
FIG. 6 is a flowchart showing an operation of an information provision apparatus of according to a second embodiment of the present invention.

FIG. 6 is a flowchart showing the operation of the information provision apparatus 10 according to the second embodiment. The operation of the information provision apparatus 10 is controlled by the ECU 11.

Steps S11 to S17 are repeated at t (e.g., 0.1) second intervals.

In step S11, the ECU 11 obtains information of the driver's vehicle 1 and information of all opponent vehicles 2 in the vicinity of the driver's vehicle 2 at the current time t0. The ECU 11 obtains from the GPS 13, information of the driver's vehicle 1, such as information of the position (latitude and longitude) and the azimuth angle in the driving direction of the driver's vehicle 1, and obtains information of the velocity of the driver's vehicle 1 from the velocity signal SV, and information as to whether the right blinker and/or the left blinker are in the on-state or in the off-state, from the control signal SR of the right blinker and the control signal SL of the left blinker, respectively. In addition, the ECU 11 receives, through the communication device 14, information of the opponent vehicle 2 such as the position (latitude and longitude) and the driving direction (azimuth angle) of the opponent vehicle 2, information of the velocity of the opponent vehicle 2, information as to whether the right blinker and/or the left blinker of the opponent vehicle 2 are in the on-state or in the off-state, and information of the type of the vehicle (e.g., two-wheeled vehicle, ordinary motor vehicle, and large-sized vehicle) which are transmitted from the information provision apparatus 10 mounted in the opponent vehicle 2 to the information provision apparatus 10 mounted in the driver's vehicle 1. The step S11 is identical to the step S1 of the first embodiment.

In step S12, the ECU 11 predicts the position, the velocity, the driving direction of the driver's vehicle 1 at each future time tn which is set at t-second intervals in the time period that lapses T seconds (e.g., 10 seconds) from the current time t0, based on the information of the position, the velocity, and the driving direction of the driver's vehicle 1 at the current time t0 which have been obtained in step S11. Herein, it is assumed that the velocity and the driving direction obtained in step S11 are maintained for T seconds to predict the velocity and the driving direction at each future time in the period that lapses T seconds from the current time, and the positions of the driver's vehicle 1 and each opponent vehicle 2 at each future time are calculated.

Then, in step S13, the ECU 11 selects the opponent vehicles 2 that are likely to approach the driver's vehicle 1 with respect to each of the fives cases illustrated in FIGS. 4A to 4E, among all the opponent vehicles 2 in the vicinity of the driver's vehicle 1, based on the information of the position and the driving direction of the driver's vehicle 1 and each opponent vehicle 2 at the current time t0 which have been obtained in step S11. The step S13 will be described in detail.

First of all, in preprocessing, as shown in FIG. 3, the position (latitude and longitude) and the driving direction of the driver's vehicle 1 and each opponent vehicle 2 at the current time t0 are converted into the x-y coordinate system with the position of the driver's vehicle 1 conforming to the origin of x-y coordinates and the driving direction of the driver's vehicle 1 conforming to the y-axis positive direction. Since this conversion method is identical to that of the first embodiment, it will not be further described. On the x-y coordinate system, the x-coordinate and the y-coordinate of the position of the opponent vehicle 2 are xi(m) and yi(m), and the driving angle of the opponent vehicle 2 is $\theta i$ (degrees).

In the manner described above, the ECU 11 calculates the position (xi, yi) and the driving angle $\theta i$ of the opponent vehicle 2 at the current time t0, and selects the opponent vehicle 2, i.e., the opponent vehicle 2 subjected to determination, with respect to each of the five cases illustrated in FIGS. 4A to 4E, based on select conditions described later. It should be appreciated that every opponent vehicle 2 is not selected as the opponent vehicle 2 subjected to determination with respect to any one of the five cases 5.

[Select Condition for Determination as to Vehicle Approach in Case 1]

The ECU 11 determines whether or not the position (xi, yi) and the driving angle $\theta i$ of each opponent vehicle 2 at the current time t0 meet the following conditions (1) to (3). If it is determined that all of the conditions are met, then the ECU 11 selects the associated opponent vehicle 2 as the opponent vehicle 2 subjected to determination with respect to the case 1.

$$|xi| \geq xa' \qquad (1)$$

$$0 \leq yi \qquad (2)$$

$$|\theta i| \leq \theta a \qquad (3)$$

In the formulae (1) to (3), xa' and $\theta a$ are set values prestored in the ROM 4 or the like in the ECU 11. For example, xa'=100 to 200 (m), and $\theta a$=0 to 45 degrees.

[Select Condition for Determination as to Vehicle Approach in Case 2]

The ECU 11 determines whether or not the position (xi, yi) and the driving angle $\theta i$ of each opponent vehicle 2 at the current time t0 meet the following conditions (1) to (3). If it is determined that all of the conditions are met, then the ECU 11 determines that the associated opponent vehicle 2 as the opponent vehicle 2 subjected to determination with respect to the case 2.

$$|xi| \geq xb' \qquad (1)$$

$$0 \leq yi \qquad (2)$$

$$|\theta i - 180| \leq \theta b \qquad (3)$$

In the formulae (1) to (3), xb' and $\theta b$ are set values prestored in the ROM 4 or the like in the ECU 11. For example, xb'=100 to 200 (m), and $\theta b$=0 to 45 degrees.

[Select Condition for Determination as to Vehicle Approach in Case 3]

The ECU 11 determines whether or not the position (xi, yi) and the driving angle $\theta i$ of each opponent vehicle 2 at the current time t0 meet the following conditions (1) to (3). If it is determined that all of the conditions are met, then the ECU 11 determines that the associated opponent vehicle 2 as the opponent vehicle 2 subjected to determination with respect to the case 3.

$$|xi| \leq xc' \qquad (1)$$

$$yi \leq 0 \qquad (2)$$

$$|\theta i| \leq \theta c \qquad (3)$$

In the formulae (1) to (3), xc' and $\theta c$ are set values prestored in the ROM 4 or the like in the ECU 11. For example, xc'=100 to 200 (m), and $\theta c$=0 to 45 degrees.

[Select Condition for Determination as to Vehicle Approach in Case 4]

The ECU 11 determines whether or not the position (xi, yi) and the driving angle θi of each opponent vehicle 2 at the current time t0 meet the following conditions (1) to (3). If it is determined that all of the conditions are met, then the ECU 11 determines that the associated opponent vehicle 2 as the opponent vehicle 2 subjected to determination with respect to the case 4.

$$xi \leq 0 \quad (1)$$

$$yd' \leq yi \quad (2)$$

$$|\theta i - 90| \leq \theta d \quad (3)$$

In the formulae (1) to (3), yd' and θd are set values prestored in the ROM 4 or the like in the ECU 11. For example, yd'=−200 to −100 (m), and θd=0 to 45 degrees.

[Select Condition for Determination as to Vehicle Approach in Case 5]

The ECU 11 determines whether or not the position (xi, yi) and the driving angle θi of each opponent vehicle 2 at the current time t0 meet the following conditions (1) to (3). If it is determined that all of the conditions are met, then the ECU 11 determines that the associated opponent vehicle 2 as the opponent vehicle 2 subjected to determination with respect to the case 5.

$$0 \leq xi \quad (1)$$

$$ye' \leq yi \quad (2)$$

$$|\theta i - 270| \leq \theta e \quad (3)$$

In the formulae (1) to (3), ye' and θe are set values prestored in the ROM 4 or the like in the ECU 11. For example, ye'=−200 to −100 (m), and θe=0 to 45 degrees.

In step S14, with respect to each of the opponent vehicles 2 that have been selected as the opponent vehicles 2 subjected to determination in step S13, the ECU 11 predicts the position, the velocity, and the driving direction at each future time tn which is set at t-second intervals in the time period that lapses T seconds from the current time t0, based on the information of the position, the velocity, and the driving direction at the current time t0 which have been obtained in step S11. Herein, it is assumed that the velocity and the driving direction obtained in step S11 are maintained for T seconds to predict the velocity and the driving direction at each future time in the period that lapses T seconds from the current time, and the positions of the driver's vehicle 1 and each opponent vehicles 2 at each future time are calculated.

Then, in step S15, the ECU 11 determines whether or not all the opponent vehicles 2 selected in step S13 are likely to approach the driver's vehicle 1 at each future time tn based on the information as to whether the right blinker and/or the left blinker of the driver's vehicle 1 are in the on-state or in the off-state at the current time t0 which has been obtained in step S11, the position, the velocity, and the driving direction of the driver's vehicle 1 at each future time tn which have been predicted in step S12, the information as to whether the right blinker and/or the left blinker of the opponent vehicles 2 selected in step S13 are in the on-state or in the off-state at the current time t0 which has been obtained in step S11, and the position, the velocity, and the driving direction of the opponent vehicle 2 at each future time tn which have been predicted in step S14. To determine whether or not the opponent vehicle 2 subjected to determination which is associated with an arbitrary case is likely to approach the driver's vehicle 1, among the five cases, the ECU 11 determines whether or not it is likely to approach with respect to the arbitrary case. The ECU 11 determines whether or not each arbitrary opponent vehicle 2 subjected to determination is likely to approach the driver's vehicle 1. In this case, the ECU 11 determines whether or not each arbitrary opponent vehicle 2 subjected to determination is likely to approach the driver's vehicle 1 in the arbitrary case at every future time sequentially from the future time closest to the current time. The ECU 11 decides that the future time when the arbitrary opponent vehicle 2 subjected to determination is likely to approach the driver's vehicle 1 as the time when that opponent vehicle 2 is likely to approach the driver's vehicle 1, and terminates determination. Thereafter, the ECU 11 does not make determination. The determination method with respect to each of the cases is identical to that in step S3 (FIG. 2) of the first embodiment, and will not be further described in detail. For example, the ECU 11 determines whether or not the opponent vehicle 2 subjected to determination is likely to approach the driver's vehicle 1 in the case 1 by determining whether or not the determination condition for the case 1 is met. As in the step S3 of the first embodiment, in step S15, the ECU 11 determines whether or not the opponent vehicle 2 is likely to approach the driver's vehicle 1 at the future time tx using at least the position (xi, yi), the driving angle θi and the velocity vi of the opponent vehicle 2.

If it is determined that there are plural opponent vehicles 2 that are likely to approach the driver's vehicle 1 with respect to each case in step S15, in step S16, the ECU 11 decides one opponent vehicle 2, for example, the opponent vehicle 2 whose future time when it is likely to approach the driver's vehicle 1 is the earliest. If it is determined that there are plural opponent vehicles 2 that are likely to approach the driver's vehicle 1 at the earliest future time, the ECU 11 decides one opponent vehicle 2 according to the velocity. If it is determined that there are plural vehicles with an equal velocity, the ECU 11 decides one opponent vehicle 2 according to the type of vehicle. If it is determined that there are plural vehicles of the same type, the ECU 11 decides one opponent vehicle 2 with a shortest distance from the driver's vehicle 1. The step S16 is identical to the step S4 of the first embodiment and will not be further described.

In step S17, the ECU 11 causes the display device 11 to display the opponent vehicles 2 which have been determined to be likely to approach the driver's vehicle 1 based on the results of step S15 and step S16, as in the step S5 of the first embodiment. Therefore, the display method in step S17 will not be further described in detail.

The step S12 may be performed before the step S15.

After the step S12, steps S13, S14, and S15 may be repeated. For example, in step S12, the ECU 11 predicts the position, the velocity, and the driving direction of the driver's vehicle 1 at each future time. Then, the ECU 11 may repeat the steps in such a manner that the ECU 11 selects the opponent vehicle 2 subjected to determination that is associated with the associated case, predict the position, the velocity, and the driving direction of the selected opponent vehicle 2 subjected to determination at each future time and determine whether or not the opponent vehicle 2 is likely to approach the driver's vehicle 1 with respect to the associated case, every time the opponent vehicle 2 subjected to determination is selected, until it has selected all the opponent vehicles 2 subjected to determination and it has determined whether or not they are likely to approach the driver's vehicle 1.

Also, after the steps S12 and S13, the steps S14 and S15 may be repeated. For example, after all the opponent vehicles 2 subjected to determination have been selected in step S13, the ECU 11 may repeat the steps in such a manner that the ECU 11 predicts the position, the velocity, and the driving direction of an arbitrary opponent vehicle 2 subjected to determination at each future time, and determines whether or not the opponent vehicle 2 subjected to determination is likely to approach the driver's vehicle 1 with respect to the associated case, until it has determined whether or not all the opponent vehicles 2 subjected to determination are likely to approach the driver's vehicle 1.

Since in the second embodiment, the ECU 11 selects the opponent vehicle 2 subjected to determination by a simple method using only the information of the positions and the driving directions of the driver's vehicle 1 and the opponent vehicle 2 at the current time t0, and determines whether or not the selected opponent vehicle 2 is likely to approach the driver's vehicle 1 at each future time with respect to one case, it can reduce a volume of data to be processed in the CPU3, in addition to the advantages of the first embodiment.

Whereas in the first and second embodiments, the ECU 11 decides one opponent vehicle 2 in steps S4 and S16 if it is determined that there are plural opponent vehicles 2 that are likely to approach the driver's vehicle 1 in steps S3 and S15 and causes the display device 12 to display one icon on each of the determination display regions 12*a* to 12*e*, the steps S4 and S16 may alternatively be omitted and plural icons according to the results of the steps S3 and S15 may alternatively be displayed as arranged or overlapped. In further alternative, the upper limit of the icons displayed on the determination display regions 12*a* to 12*e* is set to k (k: plural number), and if it is determined that there are (k+1) or more opponent vehicles 2 that are likely to approach the driver's vehicle 1 with respect to each case, the ECU 11 determines k opponent vehicles 2 with priority in the method of the steps S4 and S16, and causes the display device 12 to display k icons as arranged or overlapped. In this case, the first and second embodiments correspond to cases k=1.

Whereas in the first and second embodiments, the type of the opponent vehicles 2 is classified into the two-wheeled vehicle, the ordinary motor vehicle, and the large-sized vehicle, it may alternatively be classified into two, for example, the two-wheeled vehicle and other vehicles. In this case, the display device 12 may display the opponent vehicles 2 that are likely to approach the driver's vehicle 1 using the icons indicating the two-wheeled vehicle and the ordinary motor vehicle. In further alternative, without classifying the type, the display device 12 may display the opponent vehicles 2 that are likely to approach the driver's vehicle 1 using, for example, rectangular icons.

In the first and second embodiments, the ECU 11 determines whether or not the opponent vehicles 2 are likely to approach the driver's vehicle 1 with respect to the five cases, and the display device 12 has five determination display regions 12*a* to 12*e* on the image screen of the display device 12, but this is merely exemplary. For example, the ECU 11 may determine whether or not the opponent vehicle 2 is likely to approach the driver's vehicle 1 only with respect to the case 4 and the case 5, and may cause the display device 12 to display the opponent vehicles 2 on the two determination display regions corresponding to the case 4 and the case 5. That is, the ECU 11 may determine whether or not the opponent vehicle 2 is likely to approach the driver's vehicle 1 with respect to at least one case, and may cause the display device 12 to display the opponent vehicles 2 on the determination display regions on the screen of the display device 12 so as to correspond the number of the cases. If the ECU 11 determines whether or not the opponent vehicles 2 are likely to approach the driver's vehicle 1, with respect to plural cases of the five cases, it is desired that the positional relationship between the driver's vehicle 1 and the opponent vehicle 2 in each case be substantially reflected in the positional relationship between the center (assumed location of the driver's vehicle 1) of the screen and the determination display region of each case, as in the five cases described above.

Whereas in the first and second embodiments, the display device 12 displays the opponent vehicles 2 that are likely to approach the driver's vehicle 1, the driver may be informed that the opponent vehicles 2 that are likely to approach by a voice. In this case, the ECU 11 may be coupled to a speaker, and voice information to inform the driver that the opponent vehicle 2 is likely to approach the driver's vehicle 1 with respect to the respective cases may be pre-stored in the ROM 4 or the like in the ECU 11. By outputting voice information for the associated case to the speaker, the voice stating for example, "two-wheeled vehicle is approaching from behind" can be emitted from the speaker to be presented to the driver.

Whereas in the first and second embodiments, the GPS sensor 13 detects the position and the driving direction (azimuth angle) of the driver's vehicle 1 at the current time, it may detect only the position of the driver's vehicle 1 and the ECU 11 may calculate the driving direction based on the position (shifted position) of the driver's vehicle 1 which has been detected by the GPS sensor 13 at constant time (t-second) intervals. Likewise, the ECU 11 may calculate the driving velocity of the driver's vehicle 1 at the current time based on the position (shifted position) of the driver's vehicle 1 that has been detected by the GPS sensor 13 at constant time (t-second) intervals, rather than receive it from velocity sensor 15.

Whereas in the first and second embodiments, the ECU 11 obtains the driving direction and the velocity of the opponent vehicle 2 at the current time as the information of the opponent vehicle 2 that is obtained through the communication device 14, it may calculate them based on the position (shifted position) of the opponent vehicle 2 that has been obtained at constant time (t-second) intervals through the communication device 14.

Whereas in the first and second embodiments, as the position information of the driver's vehicle 1 and the opponent vehicles 2, the longitudes and the latitudes obtained from the GPS sensors 13 of the information provision apparatus 10 that are mounted in those vehicles are used, altitude information obtained from the GPS sensor 13 may be added to the position information, and may be used in determination in step S3 of the first embodiment, selection in step S13 of the second embodiment, and determination in step S15 of the second embodiment.

Whereas in the first and second embodiments, the information provision apparatuses 10 directly perform intercommunication through the communication devices 14 to obtain the information from each other, it will be appreciated that this is merely exemplary. For example, a base station may be configured to receive information transmitted from each information provision apparatus 10, and to transmit that information to another information provision apparatus 10.

In the first and second embodiments, the information provision apparatus 10 having the same construction as that of the driver's vehicle 1 is mounted in the opponent vehicle 2, but this is merely exemplary. Any other suitable device may be mounted in the opponent vehicle 2 to transmit the information of the opponent vehicle 2 to the information provision apparatus 10 of the driver's vehicle 1 to enable the information provision apparatus 10 to determine whether or not the opponent vehicle 2 is likely to approach the driver's vehicle 1. In addition, the information of the driver's vehicle 1 need not be transmitted through the communication device 14 of the information provision apparatus 10 mounted in the driver's vehicle 1 to determine whether or not the opponent vehicle 2 is likely to approach the driver's vehicle 1, and therefore the information provision apparatus 10 of the driver's vehicle 1 need not have a transmission function of the communication device 14. For example, the function to transmit the information of the driver's vehicle 1 to the information provision apparatus 10 of the opponent vehicle 2 may be provided in a device other than the information provision apparatus 10 of the first and second embodiments.

In the first and second embodiments, the ECU 11 is not necessarily constructed of a single controller but plural controllers may be distributed and may be configured to cooperate with each other to control the operation of the information provision apparatus 10. Furthermore, the ECU 11 may be configured by incorporating the function of the ECU 11 into, for example, the controller 16 of the vehicle body.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information provision apparatus mounted in a driver's vehicle, comprising:
    a communication device configured to receive information as to whether a blinker of an opponent vehicle is in an on-state or in an off-state, from the opponent vehicle;
    a vehicle approach determiner configured to execute a vehicle approach determination process to determine whether or not the opponent vehicle is likely to approach the driver's vehicle at a future time, based on driving information including information as to whether a blinker of the driver's vehicle is in an on-state or in an off-state at a current time, and driving information including information as to whether the blinker of the opponent vehicle is in an on-state or in an off-state at the current time; and
    a notification device configured to inform a driver driving the driver's vehicle of the opponent vehicle that is likely to approach the driver's vehicle, based on a result of determination by the vehicle approach determiner;
    wherein the vehicle approach determiner is configured to predict a position of the opponent vehicle with respect to the driver's vehicle at the future time, based on the information of the blinker of the opponent vehicle which is received in the communication device and the information of the driver's vehicle and execute the vehicle approach determination process based on the prediction result.

2. The information provision apparatus according to claim 1, wherein
    the vehicle approach determination process includes,
    a first determination process for determining whether or not the opponent vehicle is running forward and in substantially same direction on substantially same driving path of the driver's vehicle at the future time and is likely to approach the driver's vehicle at the future time, based on the driving information of the driver's vehicle at the current time and the driving information of the opponent vehicle at the current time;
    a second determination process for determining whether or not the opponent vehicle is running forward and from substantially opposite direction on substantially the same driving path of the driver's vehicle at the future time and is likely to approach the driver's vehicle at the future time, based on the driving information of the driver's vehicle at the current time and the driving information of the opponent vehicle at the current time; and
    a third determination process for determining whether or not the opponent vehicle is running behind the driver's vehicle and in substantially the same direction on substantially the same driving path of the driver's vehicle at the future time and is likely to approach the driver's vehicle at the future time, based on the driving information of the driver's vehicle at the current time and the driving information of the opponent vehicle at the current time.

3. The information provision apparatus according to claim 2, wherein the vehicle approach determination process further includes a re-determination process to decide, in a case where there are plural opponent vehicles that are determined to be likely to approach the driver's vehicle in each of the determination processes of the vehicle approach determination process, one opponent vehicle that is likely to approach the driver's vehicle, based on a predetermined condition.

4. The information provision apparatus according to claim 2, wherein the vehicle approach determination process further includes:
    a fourth determination process for determining whether or not the opponent vehicle is running from leftward to rightward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and
    a fifth determination process for determining whether or not the opponent vehicle is running from rightward to leftward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time.

5. The information provision apparatus according to claim 2, wherein
    the blinker of the driver's vehicle and the blinker of the opponent vehicle are each comprised of right and left blinkers; wherein
    the driving information of the driver's vehicle at the current time which is used in the first determination process is information of a position, a driving direction and a driving velocity of the driver's vehicle, and the driving information of the opponent vehicle at the current time which is used in the first determination process is information of a position, a driving direction, and a driving velocity of the opponent vehicle and information as to whether the right blinker and/or the left blinker of the opponent vehicle are in an on-state or in an off-state at the current time;
    wherein the driving information of the driver's vehicle at the current time which is used in the second determination process is the information of the position, the driving direction, and the driving velocity of the driver's vehicle, and information as to whether the right blinker or the left blinker of the driver's vehicle is in an on-state or in an off-state, and the driving information of the opponent vehicle at the current time which is used in the second determination process is the information of the position, the driving direction, and the driving velocity of the opponent vehicle and information as to whether the right blinker or the left blinker of the opponent vehicle is in an on-state or in an off-state;

wherein the driving information of the driver's vehicle at the current time which is used in the third determination process is the information of the position, the driving direction and the driving velocity of the driver's vehicle and information as to whether the right blinker and/or the left blinker of the driver's vehicle are in an on-state or in an off-state, and the driving information of the opponent vehicle at the current time which is used in the third determination process is the information of the position, the driving direction, and the driving velocity of the opponent vehicle; and wherein the driving information of the driver's vehicle at the current time which is used in the fourth and fifth determination processes is the information of the position, the driving direction, and the driving velocity of the driver's vehicle, and the driving information of the opponent vehicle at the current time which is used in the fourth and fifth determination processes is the information of the position, the driving direction, and the driving velocity of the opponent vehicle.

6. The information provision apparatus according to claim 5, further comprising:

a position detector configured to detect the position of the driver's vehicle;

a direction detector configured to detect the driving direction of the driver's vehicle;

a communication device configured to receive the information as to whether the right blinker and/or the left blinker of the opponent vehicle are in the on-state or in the off-state and the information of the position of the opponent vehicle; and a calculator configured to calculate the driving direction and the driving velocity of the opponent vehicle from the information of the position of the opponent vehicle which is received by the communication device; wherein the vehicle approach determiner is configured to obtain the information as to whether the right blinker and/or the left blinker of the driver's vehicle are in the on-state or in the off-state and the information of the driving velocity of the driver's vehicle from a vehicle body of the driver's vehicle.

7. The information provision apparatus according to claim 6, wherein the position detector includes a GPS sensor, and the direction detector includes a calculator configured to calculate the driving direction of the driver's vehicle from the position of the driver's vehicle which is detected by the GPS sensor.

8. The information provision apparatus according to claim 6, wherein the position detector and the direction detector include the GPS sensor.

9. The information provision apparatus according to claim 5, further comprising:

a position detector configured to detect the position of the driver's vehicle;

a direction detector configured to detect the driving direction of the driver's vehicle;

a communication device configured to receive the information as to whether the right blinker and/or the left blinker of the opponent vehicle are in the on-state or in the off-state and the information of the position and the driving direction of the opponent vehicle; and a calculator configured to calculate the driving velocity of the opponent vehicle based on the information of the position of the opponent vehicle which is received by the communication device; wherein the vehicle approach determiner is configured to obtain the information as to whether the right blinker and/or the left blinker of the driver's vehicle are in the on-state or in the off-state and the information of the driving velocity of the driver's vehicle from a vehicle body of the driver's vehicle.

10. The information provision apparatus according to claim 5, further comprising:

a position detector configured to detect the position of the driver's vehicle;

a direction detector configured to detect the driving direction of the driver's vehicle;

a communication device configured to receive the information as to whether the right blinker and/or the left blinker of the opponent vehicle are in the on-state or in the off-state and the information of the position and the driving velocity of the opponent vehicle; and a calculator configured to calculate the driving direction of the opponent vehicle from the information of the position of the opponent vehicle which is received by the communication device; wherein the vehicle approach determiner is configured to obtain the information as to whether the right blinker and/or the left blinker of the driver's vehicle are in the on-state or in the off-state and the information of the driving velocity of the driver's vehicle from a vehicle body of the driver's vehicle.

11. The information provision apparatus according to claim 2, wherein the vehicle approach determiner is configured to execute a first detection process to detect the opponent vehicle running forward of the driver's vehicle and in substantially the same direction on substantially the same driving path of the driver's vehicle at the current time based on the driving information of the driver's vehicle at the current time and the driving information of the opponent vehicle at the current time, and then execute the first determination process with respect to the detected opponent vehicle;

wherein the vehicle approach determiner is configured to execute a second detection process to detect the opponent vehicle running forward of the driver's vehicle and from substantially opposite direction on substantially the same driving path of the driver's vehicle at the current time, based on the driving information of the driver's vehicle at the current time and the driving information of the opponent vehicle at the current time, and then execute the second determination process with respect to the detected opponent vehicle;

wherein the vehicle approach determiner is configured to execute a third detection process to detect the opponent vehicle running behind the driver's vehicle and in substantially the same direction on substantially the same driving path of the driver's vehicle at the current time, based on the driving information of the driver's vehicle at the current time and the driving information of the opponent vehicle at the current time, and then execute the third determination process with respect to the detected opponent vehicle;

wherein the vehicle approach determiner is configured to execute a fourth detection process to detect the opponent vehicle running forward of the driver's vehicle and from leftward to rightward of the driver's vehicle so as to substantially cross the driving direction of the driver's vehicle, based on the driving information of the driver's vehicle at the current time and the driving information of the opponent vehicle at the current time, and then execute the fourth determination process with respect to the detected opponent vehicle; and wherein the vehicle approach determiner is configured to execute a fifth detection process to detect the opponent vehicle running forward of the driver's vehicle and from rightward to leftward of the driver's vehicle so as to substantially cross the driving direction of the driver's vehicle, based on the driving information of the driver's vehicle at the current time and the driving information of the opponent vehicle at the current time, and then execute the fifth determination process with respect to the detected opponent vehicle.

12. The information provision apparatus according to claim 11, wherein the driving information of the driver's vehicle at the current time which is used in each of the first to fifth detection processes is the information of the position and the driving direction of the driver's vehicle, and the driving information of the opponent vehicle at the current time is the information of the position and the driving direction of the opponent vehicle.

13. The information provision apparatus according to claim 1, wherein the vehicle approach determination process is to determine whether or not the opponent vehicle is likely to approach the driver's vehicle at plural future times, and the plural future times include times that are set at constant intervals in a period that lapses a predetermined time from the current time, in the vehicle approach determination process, the vehicle approach determiner is configured to predict position and direction of the opponent vehicle with respect to the driver's vehicle at each of the future times, based on positions, velocities and driving directions of the driver's vehicle and the opponent vehicle, and to determine whether or not the blinker of the opponent vehicle is in an on-state or in an off-state and prediction result at each of the future times.

14. The information provision apparatus according to claim 1, wherein the vehicle approach determiner is configured to periodically repeat the vehicle approach determination process.

15. The information provision apparatus according to claim 1, wherein the notification device is a display device configured to display the opponent vehicle that is likely to approach the driver's vehicle on a screen of the display device by an icon, the notification device is configured to obtain information of plural opponent vehicles in a vicinity of the driver's vehicle, and the notification device is configured to display one opponent vehicle which is likely to approach the driver's vehicle according to a predetermined rule, if there are plural opponent vehicles which are likely to approach the driver's vehicle.

16. The information provision apparatus according to claim 15, wherein the display device is configured to display a smaller icon when a distance between the driver's vehicle and the opponent vehicle at the current time that is calculated from the information of the position of the driver's vehicle included in the driving information of the driver's vehicle at the current time and the information of the position of the opponent vehicle included in the driving information of the opponent vehicle at the current time that is likely to approach the driver's vehicle is a predetermined value or more and to display a larger icon when the distance is less than the predetermined value.

17. The information provision apparatus according to claim 15, wherein the display device is configured to display a pattern indicating a degree of the driving velocity of the opponent vehicle as a background image of the icon, based on the information of the driving velocity of the opponent vehicle that is included in the driving information of the opponent vehicle at the current time that is likely to approach the driver's vehicle.

18. The information provision apparatus according to claim 17, wherein the pattern displayed as the background image of the icon is a V-shaped stripe pattern, and the degree of the driving velocity of the opponent vehicle is indicated in such a manner that a width and/or spacing of a stripe of the V-shaped stripe pattern is made smaller when the driving velocity of the opponent vehicle that is likely to approach the driver's vehicle is a predetermined value or more and is made larger when the driving velocity of the opponent vehicle is less than the predetermine value, and/or an angle of a V-shape of the V-shaped stripe pattern is made smaller when the driving velocity of the opponent vehicle is the predetermined or more and is made larger when the driving velocity of the opponent vehicle is less than the predetermined value.

19. The information provision apparatus according to claim 15, wherein the display device is configured to display the icon in a shape indicating a type of the opponent vehicle, based on information of the type of the opponent vehicle that is likely to approach the driver's vehicle, and wherein a two-wheeled vehicle, an ordinary motor vehicle and a large-sized vehicle are set as icons.

20. The information provision apparatus according to claim 15, wherein the vehicle approach determination process includes, among a first determination process, a second determination process, a third determination process, a fourth determination process, and a fifth determination process, at least the first determination process, the second determination process, and the third determination process, wherein the first determination process is to determine whether or not the opponent vehicle is running forward and in substantially same direction on substantially same driving path of the driver's vehicle at the future time and is likely to approach the driver's vehicle at the future time, based on the driving information of the driver's vehicle at the current time and the driving information of the opponent vehicle at the current time;

the second determination process is to determine whether or not the opponent vehicle is running forward and from substantially opposite direction on substantially the same driving path of the driver's vehicle at the future time and is likely to approach the driver's vehicle at the future time, based on the driving information of the driver's vehicle at the current time and the driving information of the opponent vehicle at the current time;

the third determination process is to determine whether or not the opponent vehicle is running behind the driver's vehicle and in substantially the same direction on substantially the same driving path of the driver's vehicle at the future time and is likely to approach the driver's vehicle at the future time, based on the driving information of the driver's vehicle at the current time and the driving information of the opponent vehicle at the current time;

the fourth determination process is to determine whether or not the opponent vehicle is running from leftward to rightward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and the fifth determination process is to determine whether or not the opponent vehicle is running from rightward to leftward of the driver's vehicle so as to substantially cross the driving direction of the driver's vehicle at the future time and is likely to approach the driver's vehicle at the future time, based on the driving information of the driver's vehicle at the current time and the driving information of the opponent vehicle at the current time; and wherein the display device is configured to divide a display region of the screen into plural determination display regions for displaying icons of the opponent vehicles that are determined to be likely to approach the driver's vehicle in the determination processes of the vehicle approach determination process so as to respectively correspond to the determination processes, and the determination display regions are disposed to substantially reflect a positional relationship between the driver's vehicle and the opponent vehicles which are associated with the respective determination processes in a positional relationship between an icon of the driver's vehicle and the icons of the opponent vehicles displayed on the determination display regions when the icon of the driver's vehicle is displayed at a substantially center region of the screen.

21. The information provision apparatus according to claim 20, wherein the vehicle approach determination process includes the first to fifth determination processes; and wherein the display device is configured to dispose the determination display region corresponding to the first determination process at an upper region of one of a left side and a right side of the screen, the determination display region corresponding to the second determination process at an upper region of an opposite side of the left side and the right side of the screen, the determination display region corresponding to the third determination process at a substantially center position of a lower region of the screen, the determination display region corresponding to the fourth determination process at a center region or a lower region of the left side of the screen, and the determination display region corresponding to the fifth determination process at a center region or a lower region of the right side of the screen.

22. A driving assistance system comprising:

an information provision apparatus mounted in a driver's vehicle; including a vehicle approach determiner configured to execute a vehicle approach determination process to determine whether or not an opponent vehicle is likely to approach the driver's vehicle at a future time, based on driving information including information as to whether a blinker of the driver's vehicle is in an on-state or in an off-state at a current time, and driving information including information as to whether a blinker of the opponent vehicle is in an on-state or in an off-state at the current time; and a notification device configured to inform a driver driving the driver's vehicle of an opponent vehicle that is likely to approach the driver's vehicle, based on a result of determination by the vehicle approach determiner; and an information transmitter configured to transmit driving information including information as to whether or not a blinker of the driver's vehicle is in an on-state or in an off-state at a current time, to the opponent vehicle, as driving information including information as to whether or not a blinker of the opponent vehicle is in an on-state or in an off-state;

wherein the information provision apparatus includes a communication device configured to receive the information about the blinker of the opponent vehicle which is transmitted from the opponent vehicle and to present the information to the vehicle approach determiner.

23. The driving assistance system according to claim 22, wherein the vehicle approach determiner is configured to calculate the driving information of the opponent vehicle at the current time, based on the information presented by the communication device.

\* \* \* \* \*